(12) United States Patent
Makuta

(10) Patent No.: US 10,336,100 B2
(45) Date of Patent: Jul. 2, 2019

(54) METHOD FOR FORMING AN IMAGE ON CORRUGATED CARDBOARD COMPRISING APPLYING A TREATMENT LIQUID, FIRST INK COMPOSITION, AND SECOND INK COMPOSITION

(71) Applicant: FUJIFILM CORPORATION, Minato-ku, Tokyo (JP)

(72) Inventor: Toshiyuki Makuta, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/817,303

(22) Filed: Nov. 20, 2017

(65) Prior Publication Data

US 2018/0072073 A1    Mar. 15, 2018

Related U.S. Application Data

(63) Continuation of application No. PCT/JP2016/065439, filed on May 25, 2016.

(30) Foreign Application Priority Data

Jun. 3, 2015    (JP) .................................. 2015-113396

(51) Int. Cl.
  *B41J 11/00*    (2006.01)
  *B41J 2/01*    (2006.01)
  (Continued)

(52) U.S. Cl.
  CPC .............. *B41J 11/0015* (2013.01); *B41J 2/01* (2013.01); *B41M 5/0017* (2013.01);
  (Continued)

(58) Field of Classification Search
  CPC ...... B41J 11/0015; B41J 2/01; B41M 5/0017; B41M 5/0047; B41M 5/0035;
  (Continued)

(56) References Cited

U.S. PATENT DOCUMENTS

2007/0229637 A1* 10/2007 Makuta ................ C09D 11/101
                                                                 347/100
2011/0205290 A1    8/2011 Tojo et al.
(Continued)

FOREIGN PATENT DOCUMENTS

CN          102827507 A    12/2012
CN          103242703 A    8/2013
(Continued)

OTHER PUBLICATIONS

English language translation of the following: Office action dated Jun. 19, 2018 from the JPO in a Japanese patent application No. 2017-521855 corresponding to the instant patent application.
(Continued)

*Primary Examiner* — Henok D Legesse
(74) *Attorney, Agent, or Firm* — Solaris Intellectual Property Group, PLLC

(57) ABSTRACT

Provided are an image forming method and a corrugated cardboard. The image forming method includes applying a treatment liquid containing at least one kind of acidic compound and having a pH of equal to or lower than 2 onto a corrugated cardboard substrate of $L^* \le 90$, applying a first ink composition, which contains a coloring material and water and in which a total content of resin particles and wax particles is equal to or less than 2% by mass with respect to a total mass of the first ink composition, to a treatment liquid-applied surface of the corrugated cardboard substrate onto which the treatment liquid is applied by an ink jet method under a condition of an amount of a liquid droplet of equal to or greater than 10 picoliters, and applying a second ink composition, which contains a resin, a wax, and water and in which a content of a coloring material is equal to or smaller than 0.5% by mass with respect to a total mass
(Continued)

of the second ink composition, onto the first ink composition applied to the corrugated cardboard substrate.

20 Claims, 2 Drawing Sheets

(51) Int. Cl.
    *B41M 5/00*     (2006.01)
    *C09D 11/30*     (2014.01)
    *C09D 11/54*     (2014.01)
    *C09D 11/033*     (2014.01)
    *C09D 11/322*     (2014.01)

(52) U.S. Cl.
    CPC ......... *B41M 5/0047* (2013.01); *C09D 11/033* (2013.01); *C09D 11/30* (2013.01); *C09D 11/322* (2013.01); *C09D 11/54* (2013.01); *B41M 5/0035* (2013.01)

(58) Field of Classification Search
    CPC ..... C09D 11/322; C09D 11/033; C09D 11/54; C09D 11/30
    See application file for complete search history.

(56) References Cited

U.S. PATENT DOCUMENTS

| | | |
|---|---|---|
| 2012/0320121 A1 | 12/2012 | Arai et al. |
| 2013/0201252 A1* | 8/2013 | Namba ............... C09D 5/00 347/21 |
| 2014/0368591 A1* | 12/2014 | Umebayashi ........ C09D 11/101 347/102 |

FOREIGN PATENT DOCUMENTS

| | | |
|---|---|---|
| EP | 2042326 A2 | 4/2009 |
| EP | 2623330 A1 | 8/2013 |
| JP | 2007-136734 A | 6/2007 |
| JP | 2007-161823 A | 6/2007 |
| JP | 2008-31579 A | 2/2008 |
| JP | 2009-12277 A | 1/2009 |
| JP | 2010-46896 A | 3/2010 |
| JP | 2013-176972 A | 9/2013 |
| JP | 2014-94998 A | 5/2014 |

OTHER PUBLICATIONS

Extended European Search Report dated May 23, 2018, issued in corresponding EP Patent Application No. 16803164.9.
International Search Report issued in International Application No. PCT/JP2016/065439 dated Jul. 26, 2016.
Written Opinion of the ISA issued in International Application No. PCT/JP2016/065439 dated Jul. 26, 2016.
Chinese office action dated Sep. 26, 2018, from the SIPO in a Chinese patent application corresponding to the instant patent application.
Partial English language translation of the following: Search Report of the Chinese office action dated Sep. 14, 2018, from the SIPO in a Chinese patent application No. 201680031833.1 corresponding to the instant patent application.

\* cited by examiner

METHOD FOR FORMING AN IMAGE ON CORRUGATED CARDBOARD COMPRISING APPLYING A TREATMENT LIQUID, FIRST INK COMPOSITION, AND SECOND INK COMPOSITION

CROSS-REFERENCE TO RELATED APPLICATIONS

This application is a continuation application of International Application No. PCT/JP2016/065439, filed May 25, 2016, the disclosure of which is incorporated herein by reference in its entirety. Further, this application claims priority from Japanese Patent Application No. 2015-113396, filed Jun. 3, 2015, the disclosure of which is incorporated herein by reference in its entirety.

BACKGROUND OF THE INVENTION

1. Field of the Invention

The present invention relates to an image forming method and a corrugated cardboard.

2. Description of the Related Art

As an ink composition for an ink jet (hereinafter, simply referred to as "ink composition" as well) used for forming images by an ink jet method, in addition to a solvent-based ink composition in which a solvent is used a dissolvent, an aqueous ink composition is also known in which water is used as a dissolvent in consideration of the earth environment and the working environment.

In recent years, the image forming method performed by an ink jet method has been widely used because this method makes it possible to rapidly form images and to record high-quality images on a variety of substrates.

As an image forming method performed by using an aqueous ink composition, for example, JP2014-94998A discloses an ink jet recording method including a pretreatment step of applying a pretreatment liquid onto a surface of a recording medium as normal paper on which a coated layer is disposed, an image forming step of forming an image by applying an ink jet recording ink, which contains water, a water-soluble organic solvent, a surfactant, and a colorant, onto the surface onto which the pretreatment liquid is applied, and a step of forming a transparent protective layer by applying a post-treatment liquid containing a water dispersible resin onto the surface of the recording medium onto which the ink is applied.

Furthermore, JP2013-176972A discloses an image forming method of forming an image on a recording medium, which is normal paper treated with a pretreatment liquid containing an aliphatic organic salt or an inorganic metal salt, a water-soluble organic solvent, and water, by using an aqueous ink and then coating the image by jetting a post-treatment liquid, which contains a urethane resin, a fluorine atom-based surfactant, a water-soluble organic solvent, and water, to an image forming area.

SUMMARY OF THE INVENTION

Incidentally, in recent years, even in a case where an image is formed on a corrugated cardboard, a need for reducing a lot size has increased. The corrugated cardboard is a paper substrate prepared by bonding at least one sheet of flat paper to paper processed to become wavy. In a case where an image is formed on the corrugated cardboard, in view of costs, it is advantageous to form the image on the surface of the corrugated cardboard after the corrugated cardboard is prepared. To meet such a requirement, it is suitable to use an image forming method performed by an ink jet method.

However, the recording surface of the corrugated cardboard shows asperities and warping, and in a case where an image is formed thereon by an ink jet method, unless an ink jet head and the recording surface are spaced apart, the ink jet head and the recording surface easily contact each other, and hence an image cannot be stably formed. In contrast, in a case where the ink jet head and the recording surface are spaced apart, if the amount of the liquid droplet of the ink is small, it is difficult to make the ink land on an intended position. Therefore, it is effective to increase the amount of the liquid droplet of the ink. However, in a case where the amount of the liquid droplet of the ink is large, the landing interference of the liquid droplets of the ink and the merging of the liquid droplets of the ink after landing easily occur. Consequently, a phenomenon (so-called mottling) easily occurs in which density unevenness is caused because a region with high density partially occurs within the formed image. In order to inhibit the occurrence of the mottling, the nozzle density in the ink jet head needs to be reduced such that the landing interference of the liquid droplets of the ink does not easily occur. Meanwhile, in a case where the liquid droplets of the ink do not spread after landing, voids occur between the liquid droplets, and as a result, the color of the corrugated cardboard tends to be seen, and the intended colors (flexo colors) tends not to be able to be reproduced.

The flexo colors mentioned herein mean standard colors (17 colors except for white) in the 2006 edition of "Sample book of corrugated cardboard printing ink" published by three relevant associations of Japan Corrugated Case Association, Japan Paper-box & Corrugated-box Association, and JAPAN PRINTING INK MAKERS ASSOCIATION.

In the related art, an image forming system is suggested in which an image is formed by applying a treatment liquid containing an acidic compound and then jetting an ink composition containing a coloring material, resin particles, and wax particles by using an ink jet head.

In a case where the ink composition used in such an image forming system is used for forming an image on a corrugated cardboard, the liquid droplets of the ink having landed do not sufficiently spread, the color of the corrugated cardboard is seen, and hence the flexo colors cannot be reproduced. In contrast, in a case where an ink composition which does not contain resin particles and wax particles is used, even though flexo colors can be reproduced, the rub resistance of the image tends to be poor.

In the image forming methods described in JP2014-94998A and JP2013-176972A, the formation of an image on a corrugated cardboard substrate is not examined. With the methods described in JP2014-94998A and JP2013-176972A, it is impossible to confer the rub resistance of an image with reproducing flexo colors.

An embodiment of the present invention is established in consideration of the aforementioned problem, and objects thereof are to provide an image forming method for forming an image, which has excellent flexo color reproducibility and rub resistance and in which the occurrence of mottling is inhibited, on a corrugated cardboard substrate of $L^* \leq 90$ and to provide a corrugated cardboard on which an image is formed by the image forming method.

Specific means for achieving the aforementioned objects include the following aspects.

<1> An image forming method comprising applying a treatment liquid containing at least one kind of acidic compound and having a pH of equal to or lower than 2 onto a corrugated cardboard substrate of $L^*\leq 90$, applying a first ink composition, which contains a coloring material and water and in which in which a total content of resin particles and wax particles is equal to or less than 2% by mass with respect to a total mass of the first ink composition, to a treatment liquid-applied surface of the corrugated cardboard substrate onto which the treatment liquid is applied by an ink jet method under a condition of an amount of a liquid droplet of equal to or greater than 10 picoliters, and applying a second ink composition, which contains a resin, a wax, and water and in which a content of a coloring material is equal to or smaller than 0.5% by mass with respect to a total mass of the second ink composition, onto the first ink composition applied to the corrugated cardboard substrate.

<2> The image forming method described in <1>, in which the resin contained in the second ink composition contains a urethane resin.

<3> The image forming method described in <1> or <2>, in which the coloring material contained in the first ink composition contains a pigment.

<4> The image forming method described in any one of <1> to <3>, in which in the applying of the first ink composition to the treatment liquid-applied surface of the corrugated cardboard substrate, the first ink composition is applied using an ink jet head with a nozzle density of equal to or lower than 600 nozzles per inch.

<5> The image forming method described in any one of <1> to <4>, in which in the applying of the first ink composition to the treatment liquid-applied surface of the corrugated cardboard substrate, the first ink composition is applied using an ink jet head with a nozzle density of equal to or lower than 400 nozzles per inch in an amount of a liquid droplet of equal to or greater than 25 picoliters and equal to or smaller than 40 picoliters.

<6> The image forming method described in any one of <1> to <5>, in which the resin in the second ink composition is resin particles, the wax in the second ink composition is wax particles, and the second ink composition is applied by an ink jet method.

<7> The image forming method described in any one of <1> to <6>, in which in the applying of the first ink composition, the first ink composition is applied at a dot area rate of equal to or higher than 100%.

<8> A corrugated cardboard on which an image is formed by the image forming method described in any one of <1> to <7>.

According to an embodiment of the present invention, there are provided an image forming method for forming an image, which has excellent flexo color reproducibility and rub resistance and in which the occurrence of mottling is inhibited, on a corrugated cardboard substrate of $L^*\leq 90$, and a corrugated cardboard on which an image is formed by the image forming method.

DESCRIPTION OF THE PREFERRED EMBODIMENTS

[Image Forming Method]

Figure 1:
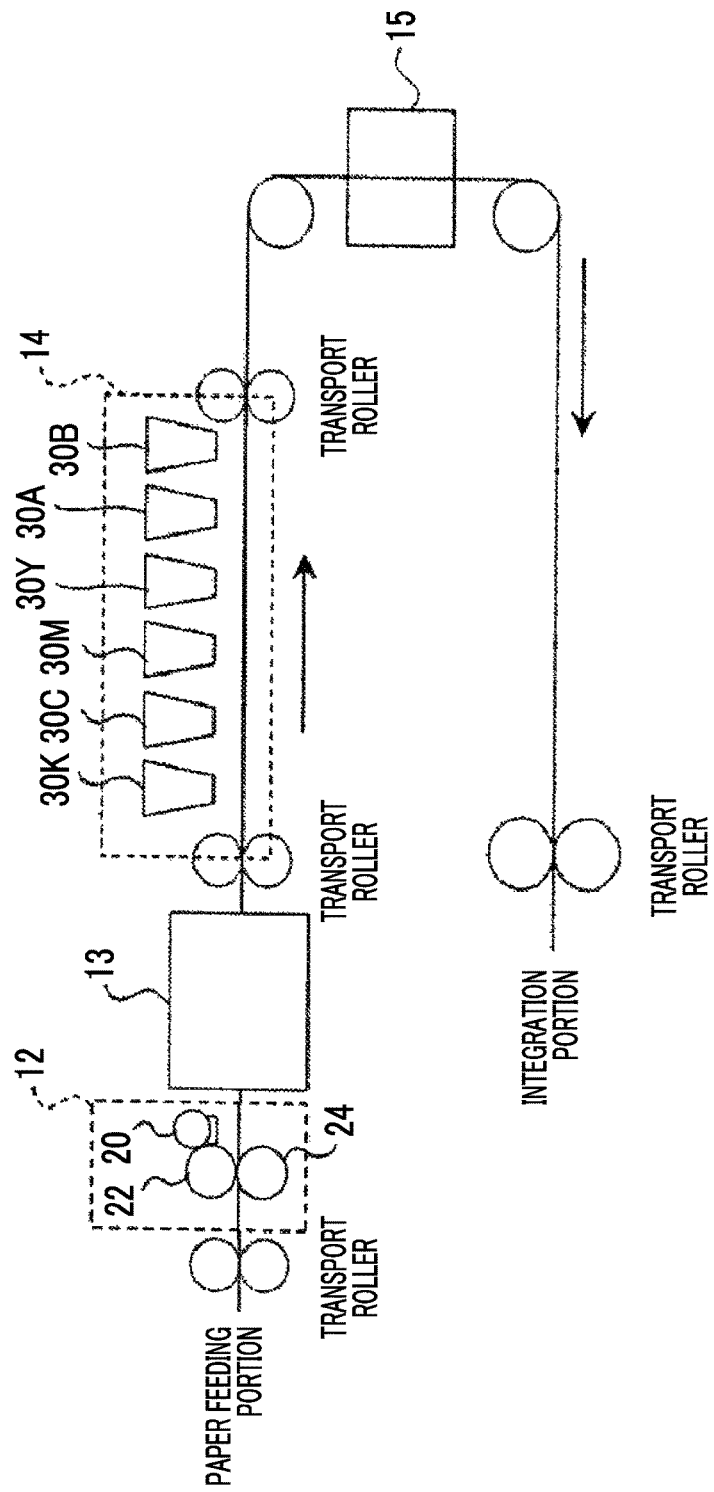
FIG. 1 is a schematic block diagram showing an example of an ink jet image forming apparatus used for embodying image formation.

The image forming method of an embodiment of the present invention includes applying a treatment liquid containing at least one kind of acidic compound and having a pH of equal to or lower than 2 onto a corrugated cardboard substrate of $L^*\leq 90$ (hereinafter, referred to as a treatment liquid applying step as well), applying a first ink composition, which contains a coloring material and water and in which a total content of resin particles and wax particles is equal to or less than 2% by mass with respect to a total mass of the first ink composition, to a treatment liquid-applied surface of the corrugated cardboard substrate onto which the treatment liquid is applied by an ink jet method under a condition of an amount of a liquid droplet of equal to or greater than 10 picoliters (hereinafter, referred to as a first ink step as well), and applying a second ink composition, which contains a resin, a wax, and water and in which a content of a coloring material is equal to or smaller than 0.5% by mass with respect to a total mass of the second ink composition, onto the first ink composition applied to the corrugated cardboard substrate (hereinafter, referred to as a second ink applying step as well).

The image forming method may have a drying step of drying the treatment liquid, the first ink composition, or the second ink composition applied in each step, after each of the treatment liquid applying step, the first ink applying step, and the second ink applying step.

The operation of the image forming method is unclear but is assumed to be as below according to the inventors of the present invention.

Regarding the ink composition of the related art containing resin particles and wax particles, the liquid droplets having landed do not sufficiently spread, and hence flexo colors cannot be reproduced. In contrast, with an ink composition which does not contain resin particles and wax particles, flexo colors are easily reproduced, but the rub resistance of the image is poor.

In the image forming method of an embodiment of the present invention, the treatment liquid is applied to a corrugated cardboard substrate by the treatment liquid applying step, the first ink composition is applied onto the applied treatment liquid, and in this way, the component (particularly, the coloring material) in the first ink composition is aggregated. It is considered that, accordingly, the coloring material may be inhibited from permeating the substrate, and the coloring material may remain on the substrate surface. Furthermore, because the first ink composition contains the coloring material, and the total content of the resin particles and the wax particles in the first ink composition is equal to or smaller than 2% by mass, the liquid droplets of the first ink composition having landed on the corrugated cardboard substrate appropriately spread. As a result, while the merging of the liquid droplets is inhibited due to the aggregation effect, an image in which the occurrence of voids is inhibited is formed on the corrugated cardboard substrate, and consequently, an image of an intended color is obtained. Accordingly, an image is obtained in which the occurrence of mottling (density unevenness) is inhibited and which has high reproducibility of flexo colors. In addition, because the second ink composition containing a resin and a wax is applied onto the first ink composition on the corrugated cardboard substrate to which the first ink composition is applied, the rub resistance of the image can be maintained.

Because the aforementioned steps are performed, an image is formed which has excellent flexo color reproducibility and rub resistance and in which the occurrence of mottling is inhibited.

Hereinafter, the image forming method of an embodiment of the present invention will be specifically described.

The ink composition used for forming an image will be simply referred to as "ink" in some cases. Furthermore, the aggregation of a component in the ink composition will be referred to as "aggregation of ink (composition)" in some cases. In addition, the corrugated cardboard substrate will be simply referred to as "substrate" in some cases.

In the present specification, "to" showing a range of numerical values represents a range including numerical values as an upper limit and a lower limit thereof. In the present specification, in a case where a plurality of substances corresponding to each component are present in the ink composition, unless otherwise specified, the amount of each component in the ink composition means the total amount of the plurality of substances present in the ink composition.

In the present specification, "wax" means a polymer compound having a melting point of equal to or lower than 170° C., and "wax particles" mean particles formed of the wax.

In this respect, the wax can be differentiated from "resin" which is a polymer compound that does not have a melting point or has a melting point of higher than 170° C.

The melting point means a temperature of an endothermal peak top in DSC analysis using a differential scanning calorimetry (DSC) (for example, a differential scanning calorimetry (DSC) EXSTAR 6220 manufactured by Hitachi High-Tech Science Corporation).

[Treatment Liquid Applying Step]

The image forming method includes a treatment liquid applying step of applying a treatment liquid containing at least one kind of acidic compound and having a pH of equal to or lower than 2 onto a corrugated cardboard substrate of $L^*\leq 90$.

The treatment liquid applying step is a step of applying a treatment liquid having at least one kind of acidic compound, which aggregates the component in the ink composition which will be described later, and having a pH of equal to or lower than 2 onto a corrugated cardboard substrate. The treatment liquid applying step aggregates the component in the ink composition applied in the first ink applying step which will be described later. Because the component (particularly, the coloring material) in the ink composition is aggregated on the corrugated cardboard substrate, it is possible to inhibit the component in the ink composition from permeating the corrugated cardboard substrate.

<Corrugated Cardboard Substrate>

In the image forming method, an image is formed on a corrugated cardboard substrate of $L^*\leq 90$. The corrugated cardboard substrate is a paper substrate prepared by bonding at least one sheet of flat paper (liner) to paper (corrugating medium) processed to become wavy.

The corrugated cardboard substrate of $L^*\leq 90$ refers to a corrugated cardboard with a color other than white. That is, in the image forming method, in a case where the ink composition is applied to a corrugated cardboard substrate with a color other than white by an ink jet method, flexo colors can be reproduced.

From the viewpoint of making the reproducibility of flexo colors more effectively and markedly exhibited, the corrugated cardboard substrate is preferably a corrugated cardboard substrate of $L^*\leq 80$, and more preferably a corrugated cardboard substrate of $L^*\leq 70$. Furthermore, the corrugated cardboard substrate is preferably a corrugated cardboard substrate of $L^*\geq 10$, and more preferably a corrugated cardboard substrate of $L^*\geq 30$.

From the same viewpoint, a corrugated cardboard substrate is preferable which has a color gamut within a range of $\Delta E\leq 10$ base on $L^*=63$, $a^*=8$, and $b^*=26$.

$L^*$, $a^*$, $b^*$, and $\Delta E$ of the corrugated cardboard substrate are values measured using Spectrolino manufactured by GretagMacbeth GmbH.

Examples of the liner used in the corrugated cardboard substrate include K LINER, C LINER, and a lightweight liner manufactured by Ojimateria co., ltd., Rengo Co., Ltd., and the like, and various color liners.

Examples of the corrugating medium used in the corrugated cardboard substrate include a general corrugating medium, a strengthened corrugating medium, a lightweight corrugating medium, and a waterproof corrugating medium manufactured by Ojimateria co., ltd. and Rengo Co., Ltd.

As the corrugated cardboard substrate, it is possible to use those obtained by processing the aforementioned corrugating media in a wavy shape and bonding the aforementioned liners to the processed corrugating media. In an embodiment of the present invention, it is preferable to use a corrugated cardboard having undergone bonding. Examples of the corrugated cardboard substrate obtained by bonding a liner to a corrugating medium processed to become wavy include a double wall corrugated cardboard obtained by bonding two sheets of liners to a corrugating medium sandwiched between the liners, a single wall corrugated cardboard obtained by bonding one sheet of liner to a corrugating medium, a composite double wall corrugated cardboard in which a liner, a corrugating medium, a linear, a corrugating medium, and a liner are laminated in this order, and a composite double double-wall corrugated cardboard in which a liner, a corrugating medium, a liner, a corrugating medium, a linear, a corrugating medium, and a liner are laminated in this order.

<Treatment Liquid>

The treatment liquid contains at least one kind of acidic compound and has a pH of equal to or lower than 2.

From the viewpoint of the flexo color reproducibility and the inhibition of the occurrence of mottling, the pH of the treatment liquid is preferably equal to or lower than 1, and more preferably equal to or lower than 0.8.

The pH is a value measured using a pH meter WM-50EG (manufactured by DKK-TOA CORPORATION) in an environment of 25° C. (±1° C.).

(Acidic Compound)

Examples of the acidic compound include compounds which can reduce the pH of the ink composition.

As the acidic compound, any of an organic acidic compound and an inorganic acidic compound may be used, and two or more kinds of compounds selected from an organic acidic compound and an inorganic acidic compound may be used in combination.

—Organic Acidic Compound—

Examples of the organic acidic compound include organic compounds having an acidic group.

Examples of the acidic group include a phosphoric acid group, a phosphonic acid group, a phosphinic acid group, a sulfuric acid group, a sulfonic acid group, a sulfinic acid group, a carboxyl group, and the like. From the viewpoint of the aggregation rate of the ink composition, a phosphoric acid group or a carboxyl group is preferable, and a carboxyl group is more preferable.

As the organic compound having a carboxyl group (organic carboxylic acid), polyacrylic acid, acetic acid, glycolic acid, malonic acid, malic acid (preferably DL-malic acid), maleic acid, ascorbic acid, succinic acid, glutaric acid, fumaric acid, citric acid, tartaric acid, phthalic acid, 4-methylphthalic acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, salts of these (for example, polyvalent metal salts), and the like are preferable. One kind of these compounds may be used singly, or two or more kinds thereof may be used in combination.

From the viewpoint of the aggregation rate of the ink composition, the organic carboxylic acid is preferably a carboxylic acid having a valency of equal to or higher than 2 (hereinafter, referred to as a polyvalent carboxylic acid as well), more preferably at least one kind of carboxylic acid selected from malonic acid, malic acid, maleic acid, succinic acid, glutaric acid, fumaric acid, tartaric acid, 4-methylphthalic acid, and citric acid, and even more preferably malonic acid, malic acid, tartaric acid, or citric acid.

It is preferable that the organic acidic compound has a low pKa.

In a case where the organic acidic compound has a low pKa, it is possible to further reduce a surface charge of the coloring material or the like in the ink composition stably dispersed due to a slightly acidic functional group such as a carboxyl group by bringing the coloring material into contact with the organic acidic compound having a lower pKa, and to reduce the dispersion stability.

The organic acidic compound contained in the treatment liquid is preferably an acidic compound which has a low pKa, exhibits high solubility in water, and has a valency of equal to or higher than 2, and more preferably a divalent or trivalent acidic substance having a high buffering ability in a range of pH lower than the pKa of the functional group (for example, a carboxyl group) which allows the component (particularly, the coloring material) in the ink composition to be stably dispersed.

—Inorganic Acidic Compound—

Examples of the inorganic acidic compound include, but are not limited to, phosphoric acid, nitric acid, nitrous acid, sulfuric acid, hydrochloric acid, and the like. From the viewpoint of the aggregation rate of the ink composition, as the inorganic acidic compound, phosphoric acid is most preferable.

The total amount of the acidic compound contained in the treatment liquid is not particularly limited. However, from the viewpoint of the aggregation rate of the ink composition, the total amount of the acidic compound with respect to the total mass of the treatment liquid is preferably 5% by mass to 40% by mass, and more preferably 10% by mass to 30% by mass.

In a case where the organic acidic compound and the inorganic acidic compound are used in combination as the acidic compound, from the viewpoint of the aggregation rate, the content of the organic acidic compound and the inorganic acidic compound that is represented by a ratio of the content of the inorganic acidic compound to the content of the organic acidic compound is preferably 5 mol % to 50 mol %, more preferably 10 mol % to 40 mol %, and even more preferably 15 mol % to 35 mol %.

If necessary, in the treatment liquid, in addition to the acidic compound, other aggregation components such as a polyvalent metal salt and a cationic polymer may be used in combination.

As the polyvalent metal salt and the cationic polymer, for example, it is possible to use the polyvalent metal salt and the cationic polymer described in paragraphs "0155" and "0156" in JP2011-042150A.

(Water)

It is preferable that the treatment liquid contains water.

The content of water with respect to the total mass of the treatment liquid is preferably 50% by mass to 90% by mass, and more preferably 60% by mass to 80% by mass.

(Water-Soluble Solvent)

It is preferable that the treatment liquid contains at least one kind of water-soluble solvent.

As the water-soluble solvent, specifically, the water-soluble solvent that the first ink composition, which will be described later, can contain can also be used in the treatment liquid.

Particularly, from the viewpoint of the permeability of the treatment liquid with respect to the substrate, the water-soluble solvent is preferably polyalkylene glycol or a derivative thereof, more preferably at least one kind of solvent selected from diethylene glycol monoalkyl ether, triethylene glycol monoalkyl ether, dipropylene glycol, tripropylene glycol monoalkyl ether, polyoxypropylene glyceryl ether, and polyoxyethylene polyoxypropylene glycerin glycol, and even more preferably at least one kind of solvent selected from tripropylene glycol monomethyl ether (TPGmME) and diethylene glycol monobutyl ether (DEGmBE).

From the viewpoint of coating properties and the like, the content of the water-soluble solvent in the treatment liquid with respect to the total mass of the treatment liquid is preferably 3% by mass to 20% by mass, and more preferably 5% by mass to 15% by mass.

—Surfactant—

The treatment liquid may contain at least one kind of surfactant.

The surfactant can be used as a surface tension adjuster. Examples of the surface tension adjuster include a nonionic surfactant, a cationic surfactant, an anionic surfactant, a betaine-based surfactant, and the like. Among these, from the viewpoint of the aggregation rate of the ink composition, a nonionic surfactant or an anionic surfactant is preferable.

Examples of the surfactant include the compounds exemplified as surfactants on pp. 37~38 in JP1984-157636A (JP-S59-157636A) and in research disclosure No. 308119 (1989). Examples of the surfactant also include the fluorine-based (alkyl fluoride-based) surfactant or the silicone-based surfactant described in JP2003-322926A, JP2004-325707A, and JP2004-309806A, and the like.

The content of the surfactant in the treatment liquid is not particularly limited, but is preferably set such that the surface tension of the treatment liquid becomes equal to or lower than 60 mN/m, more preferably set such that the surface tension of the treatment liquid becomes 20 mN/m to 50 mN/m, and even more preferably set such that the surface tension of the treatment liquid becomes 30 mN/m to 45 mN/m.

(Nitrogen-Containing Hetero Ring Compound)

In the present invention, the treatment liquid may contain a nitrogen-containing hetero ring compound. In a case where the treatment liquid contains such a compound, it is possible to prevent a device used for applying the treatment liquid from rusting.

The structure of the nitrogen-containing hetero ring compound is preferably a 5- or 6-membered ring structure containing nitrogen, and particularly preferably a 5-membered ring structure containing nitrogen.

Among the 5- or 6-membered ring structures containing nitrogen, a 5- or 6-membered hetero ring structure containing at least one kind of atom among a carbon atom, a nitrogen atom, an oxygen atom, a sulfur atom, and a selenium atom is preferable. Herein, the hetero ring may be fused with a carbonaceous aromatic ring or a heterocyclic aromatic ring.

Examples of the hetero ring include a tetrazole ring, a triazole ring, an imidazole ring, a thiadiazole ring, an oxadiazole ring, a selenadiazole ring, an oxazole ring, a thiazole ring, a benzoxazole ring, a benzothiazole ring, a benzimidazole ring, a pyrimidine ring, a triazaindene ring, a tetraazaindene ring, a pentaazaindene ring, and the like.

These rings may have a substituent, and the substituent may be substituted with a nitro group, a halogen atom (for example, a chlorine atom and a bromine atom), a mercapto group, a cyano group, a substituted or unsubstituted alkyl group (for example, each of the groups of methyl, ethyl, propyl, t-butyl, and cyanoethyl), an aryl group (for example, each of the groups of phenyl, 4-methanesulfonamidophenyl, 4-methylphenyl, 3,4-dichlorophenyl, and naphthyl), an alkenyl group (for example, an allyl group), an aralkyl group (for example, each of the groups of benzyl, 4-methylbenzyl, and phenethyl), a sulfonyl group (for example, each of the groups of methanesulfonyl, ethanesulfonyl, and p-toluenesulfonyl), a carbamoyl group (for example, each of the groups of unsubstituted carbamoyl, methyl carbamoyl, and phenyl carbamoyl), a sulfamoyl group (for example, each of the groups of unsubstituted sulfamoyl, methyl sulfamoyl, and phenyl sulfamoyl), a carbonamide group (for example, each of the groups of acetamide and benzamide), a sulfonamide group (for example, each of the groups of methane sulfonamide, benzene sulfonamide, and p-toluene sulfonamide), an acyloxy group (for example, each of the groups of acetyloxy and benzoyloxy) a sulfonyloxy group (for example, methane sulfonyloxy), a ureido group (for example, each of the groups of unsubstituted ureido, methyl ureido, ethyl ureido, and phenyl ureido), an acyl group (for example, each of the groups of acetyl and benzoyl), an oxycarbonyl group (for example, each of the groups of methoxycarbonyl and phenoxycarbonyl), an oxycarbonylamino group (for example, each of the groups of methoxycarbonylamino, phenoxycarbonylamino, and 2-ethylhexyloxycarbonylamino), a hydroxyl group, and the like. A plurality of substituents may substitute a single ring.

The content of the nitrogen-containing hetero ring compound in the treatment liquid is not particularly limited, but is preferably 0.1% by mass to 10% by mass and more preferably 0.1% by mass to 4% by mass with respect to the total mass of the treatment liquid.

Specific examples of preferred nitrogen-containing hetero ring compounds include the following compounds.

That is, the examples include imidazole, benzimidazole, benzindazole, benzotriazole, tetrazole, benzoxazole, benaothiazole, pyridine, quinoline, pyrimidine, piperidine, piperazine, quinoxaline, morpholine, and the like. These may have a substituent such as the aforementioned alkyl group, a carboxyl group, and a sulfo group.

The 6-membered ring compound containing nitrogen is preferably a compound having a triazine ring, a pyrimidine ring, a pyridine ring, a pyrroline ring, a piperidine ring, a pyridazine ring, or a pyrazine ring. Among these, a compound having a triazine ring or a pyrimidine ring is preferable. These 6-membered ring compound containing nitrogen may have a substituent. In this case, examples of the substituent include an alkyl group having 1 to 6 carbon atoms and preferably having 1 to 3 carbon atoms, an alkoxy group having 1 to 6 carbon atoms and preferably having 1 to 3 carbon atoms, a hydroxyl group, a carboxyl group, a mercapto group, an alkoxyalkyl group having 1 to 6 carbon atoms and preferably having 1 to 3 carbon atoms, and a hydroxyalkyl group having 1 to 6 carbon atoms and preferably having 1 to 3 carbon atoms.

Specific examples of preferred 6-membered hetero ring compounds containing nitrogen include triazine, methyl triazine, dimethyl triazine, and hydroxyethyl triazine rings, pyrimidine, 4-methylpyrimidine, pyridine, and pyrroline.

(Other Additives)

If necessary, the treatment liquid may contain other additives in addition to the above components.

Other additives that can be contained in the treatment liquid are the same as other additives that can be contained in the ink composition which will be described later.

(Physical Properties of Treatment Liquid)

From the viewpoint of the aggregation rate of the ink composition, the viscosity of the treatment liquid is preferably within a range of 0.5 mPa·s to 10 mPa·s, and more preferably within a range of 1 mPa·s to 5 mPa·s. The viscosity is a value measured using a VISCOMETER TV-22 (manufactured by TOKI SANGYO CO., LTD) under the condition of 25° C. (±1° C.).

The surface tension of the treatment liquid at 25° C. (±1° C.) is preferably equal to or lower than 60 mN/m, more preferably 20 mN/m to 50 mN/m, and even more preferably 30 mN/m to 45 mN/m. It is advantageous that the surface tension of the treatment liquid is within the above range, because then the occurrence of coating unevenness is inhibited. The surface tension of the treatment liquid is measured using an Automatic Surface Tensiometer CBVP-Z (manufactured by Kyowa Interface Science Co., LTD.) by using a plate method.

(Application of Treatment Liquid)

The application of the treatment liquid can be performed using a coating method, for example, a known method such as an ink jet method or an immersion method. Coating can be performed by a known coating method using a bar coater, an extrusion die coater, an air knife coater, a blade coater, a rod coater, a knife coater, a squeeze coater, a reverse roll coater, or the like. The ink jet method will be specifically described later.

The treatment liquid applying step is performed before the first ink applying step in which the first ink composition is used.

Specifically, before the first ink composition is applied onto the corrugated cardboard substrate, the treatment liquid is applied in advance onto the corrugated cardboard substrate such that the component (for example, the coloring material or the like) in the first ink composition is aggregated, and then the first ink composition is applied such that the composition contacts the treatment liquid applied onto the corrugated cardboard substrate, thereby forming an image. In this way, the ink jet recording rate can be increased, and an image is obtained which has excellent flexo color reproducibility and in which the occurrence of mottling is inhibited.

The amount of the treatment liquid applied is not particularly limited as long as the first ink composition can be aggregated. The amount of the treatment liquid applied can be preferably set such that the amount of the acidic compound applied becomes equal to or greater than 0.01 g/m².

Particularly, it is preferable that the amount of the treatment liquid applied is set such that the amount of the acidic compound applied becomes 0.1 g/m² to 5.0 g/m². In a case where the amount of the acidic compound applied is equal to or greater than 0.01 g/m², according to various modes of use of the ink composition, excellent high-speed aggregating properties can be obtained. Furthermore, it is preferable that the amount of the acidic compound applied is equal to or smaller than 5.0 g/m², because then the surface properties of the corrugated cardboard substrate to which the treatment liquid is applied are not affected (change of gloss or the like).

In an embodiment of the present invention, a drying step may be performed after the treatment liquid applying step, such that the treatment liquid on the substrate can dry until the first ink composition is applied after the treatment liquid is applied onto the substrate. In this way, it is possible to make more acidic compound in the treatment liquid remain on the surface of the corrugated cardboard substrate, and consequently, an image having excellent flexo color reproducibility can be formed by applying a small amount of the treatment liquid. A preferred aspect of means and method for drying the treatment liquid is the same as the means and method for drying in a preferred aspect of the drying step which will be described later.

[First Ink Applying Step]

In the first ink applying step, a first ink composition, which contains a coloring material and water and in which a total content of resin particles and wax particles is equal to or smaller than 2% by mass with respect to a total mass of the first ink composition, is applied to a treatment liquid-applied surface of the corrugated cardboard substrate to which the treatment liquid is applied, by an ink jet method under a condition of an amount of a liquid droplet of equal to or greater than 10 picoliters.

By applying the first ink composition to the treatment liquid-applied surface of the corrugated cardboard substrate, to which the treatment liquid is applied, by means of an ink jet method, the component (particularly, the coloring material) in the ink composition is aggregated, and hence the coloring material is inhibited from permeating the corrugated cardboard substrate. In this case, because the total content of the resin particles and the wax particles in the ink composition is equal to or smaller than 2% by mass, the liquid droplets of the first ink composition appropriately spread. As a result, while the merging of the liquid droplets is inhibited due to the aggregation effect resulting from the treatment liquid, an image is formed on the corrugated cardboard substrate without voids, and consequently, an image of an intended color is obtained. Therefore, an image is obtained in which the occurrence of mottling is inhibited and which has high flexo color reproducibility.

In a case where a resin and a wax are contained in first ink composition in the form of water-insoluble particles, the resin particles and the wax particles are aggregated at the time when they contact the treatment liquid. Therefore, in a case where the total content of the resin particles and the wax particles in the first ink composition is equal to or smaller than 2% by mass with respect to the total mass of the ink composition, the aggregation of the first ink composition is inhibited, and the liquid droplets of the ink composition having landed on the corrugated cardboard substrate easily spread. Consequently, while the merging of the liquid droplets is inhibited due to the aggregation effect, an image in which the occurrence of voids is inhibited is formed on the corrugated cardboard substrate, and hence an image of an intended color is obtained. Accordingly, an image is obtained in which the occurrence of mottling is inhibited and which has high flexo color reproducibility.

In a case where an image is formed in a single pass by using a head with a low nozzle density as an ink jet head, high flexo color reproducibility can also be achieved.

In a case where the amount of a liquid droplet of the first ink composition, which is applied to the substrate by being jetted from a single nozzle by a single jetting operation by means of an ink jet method, is equal to or greater than 10 picoliters, it is possible to apply the ink composition to an intended position with allowing the corrugated cardboard substrate and the ink jet head to remain spaced far apart. Accordingly, it is possible to inhibit the landing interference of the ink composition and to inhibit the occurrence of mottling resulting from the merging of the liquid droplets. In a case where a head with a low nozzle density is used as an ink jet head, flexo colors can also be excellently reproduced.

<First Ink Composition>

The first ink composition contains a coloring material and water, in which the total content of resin particles and wax particles is equal to or smaller than 2% by mass with respect to the total mass of the first ink composition.

The resin particles and the wax particles are preferably water-insoluble resin particles and water-insoluble wax particles in the form of particles. "Water-insoluble" means that the amount of the particles dissolving in 100 parts by mass of water (25° C.) is equal to or smaller than 5.0 parts by mass.

The resin particles and the wax particles are preferably particles having a volume-average particle diameter within a range of 1 nm to 200 nm. The volume-average particle diameter refers to a value measured using a particle size distribution measurement apparatus (for example, MICROTRAC UPA (registered trademark) EX150 manufactured by NIKKISO CO., LTD.) exploiting light scattering.

The resin particles are differentiated from a pigment coated with a resin (resin-coated pigment) that will be described later in that the resin particles are particles formed of a resin. Furthermore, the wax particles are differentiated from a pigment coated with a wax in that the wax particles are particles formed of a wax.

From the viewpoint of the inhibition of the occurrence of mottling and the reproducibility of flexo colors, the total content of the resin particles and the wax particles with respect to the total mass of the first ink composition is preferably equal to or smaller than 1% by mass, more preferably equal to or smaller than 0.1% by mass, and particularly preferably 0% by mass (the first ink composition particularly preferably does not contain the resin particles and the wax particles).

(Coloring Material)

The first ink composition contains at least one kind of coloring material.

As the coloring material, a pigment or an acidic dye may be used. It is preferable to use a pigment as the coloring material. In a case where a pigment is used, a resin-coated pigment is preferable which has a structure wherein at least a portion of the surface of the pigment is coated with a resin (hereinafter, referred to as "coating resin" as well). In a case where the resin-coated pigment is used, the dispersion stability of the first ink composition is enhanced, and the quality of the obtained image is improved.

—Pigment—

The pigment is not particularly limited and can be appropriately selected according to the purpose. For example, the pigment may be any of an organic pigment and an inorganic pigment. Furthermore, as a coloring pigment, a carbon black pigment, a magenta pigment, a cyan pigment, and a yellow pigment may be used. In view of ink colorability, the pigment is preferably a pigment that is substantially insoluble or poorly soluble in water.

Examples of organic pigments include an azo pigment, a polycyclic pigment, a chelate dye, a nitro pigment, a nitroso pigment, aniline black, and the like. Among these, an azo pigment, a polycyclic pigment, and the like are more preferable. Examples of inorganic pigments include titanium oxide, iron oxide, calcium carbonate, barium sulfate, aluminum hydroxide, barium yellow, cadmium red, chromium yellow, carbon black, and the like. Among these inorganic pigments, carbon black is more preferable.

In a case where an organic pigment is used, from the viewpoint of the flexo color reproducibility, it is preferable that the organic pigment has a small volume-average particle diameter. In contrast, from the viewpoint of light fastness, it is preferable that the organic pigment has a large volume-average particle diameter. From the viewpoint of satisfying both the flexo color reproducibility and the light fastness, the volume-average particle diameter is preferably 10 nm to 200 nm, more preferably 10 nm to 150 nm, and even more preferably 10 nm to 120 nm. The particle size distribution of the organic pigment is not particularly limited, and the organic pigment may have a wide particle size distribution or a monodispersed particle size distribution. Furthermore, two or more kinds of organic pigments having a monodispersed particle size distribution may be used by being mixed together.

The volume-average particle diameter can be measured by the aforementioned method.

One kind of pigment may be used singly, or two or more kinds of pigments may be used in combination.

From the viewpoint of the image density, the content of the pigment in the first ink composition with respect to the total mass of the first ink composition is preferably 1% by mass to 20% by mass, and more preferably 2% by mass to 10% by mass.

—Coating Resin—

As the coating resin in the resin-coated pigment, a dispersant is preferable.

The dispersant may be any of a polymer dispersant or a low-molecular weight surfactant type dispersant.

Furthermore, the polymer dispersant may be any of a water-soluble dispersant and a water-insoluble dispersant.

As the low-molecular weight surfactant type dispersant, for example, it is possible to use the known low-molecular weight surfactant type dispersant described in paragraphs "0047" to "0052" in JP2011-178029A.

Among polymer dispersants, examples of water-soluble dispersants include hydrophilic polymer compounds. Examples of natural hydrophilic polymer compounds include plant polymers such as gum Arabic, gum tragacanth, guar gum, karaya gum, locust bean gum, arabinogalactone, pectin, and quince seed starch, seaweed-based polymers such as alginic acid, carrageenan, and agar, animal polymers such as gelatin, casein, albumin, and collagen, microorganism-based polymers such as xanthan gum and dextrin, and the like.

Examples of a modified hydrophilic polymer compounds using natural substances as raw materials include cellulose-based polymers such as methylcellulose, ethylcellulose, hydroxyethyl cellulose, hydroxypropyl cellulose, and carboxymethyl cellulose, starch-based polymers such as sodium starch glycolate and a sodium starch phosphoric acid ester, seaweed-based polymers such as sodium alginate and a propylene glycol alginic acid ester, and the like.

Examples of a synthetic hydrophilic polymer compounds include vinyl-based polymers such as polyvinyl alcohol, polyvinylpyrrolidone, and polyvinyl methyl ether, non-cross-linked polyacrylamide, polyacrylic acid or an alkali metal salt thereof, acrylic resins such as a water-soluble styrene acrylic resin, a water-soluble styrene-maleic acid resin, a water-soluble vinylnaphthalene acrylic resin, a water-soluble vinylnaphthalene-maleic acid resin, alkali metal salts of polyvinylpyrrolidone, polyvinyl alcohol, and β-naphthalene sulfonate formalin condensate, polymer compounds having a salt of cationic functional group such as quaternary ammonium or an amino group on a side chain, natural polymer compounds such as shellac, and the like.

Among these, a water-soluble dispersant into which a carboxyl group is introduced, such as a homopolymer of acrylic acid, methacrylic acid, or styrene acrylic acid and a copolymer with other monomers having other hydrophilic groups, is preferred as the hydrophilic polymer compound.

Among the polymer dispersants, as a water-insoluble dispersant, it is possible to use a polymer having both the hydrophobic portion and a hydrophilic portion. As a hydrophilic constitutional unit, a constitutional unit having an acidic group is preferable, and a constitutional unit having a carboxyl group is more preferable. Examples of water-insoluble resins include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate-(meth)acrylic acid copolymer, a vinyl acetate-maleic acid copolymer, a styrene-maleic acid copolymer, and the like.

More specifically, for example, it is possible to suitably use the water-insoluble resins described in JP2005-41994A, JP2006-273891A, JP2009-084494A, JP2009-191134A, and the like.

The weight-average molecular weight of the polymer dispersant is preferably 3,000 to 100,000, more preferably 5,000 to 50,000, even more preferably 5,000 to 40,000, and particularly preferably 10,000 to 40,000.

The weight-average molecular weight means a value measured by gel permeation chromatography (GPC).

GPC is performed using HLC-8020GPC (manufactured by Tosoh Corporation), three columns of TSK gel (registered trademark) and Super Multipore HZ-H (manufactured by Tosoh Corporation, 4.6 mmID×15 cm) as columns, and tetrahydrofuran (THF) as an eluent.

Furthermore, GPC is performed using a differential refractive index (RI) detector under the conditions of a sample concentration of 0.45% by mass, a flow rate of 0.35 ml/min, a sample injection amount of 10 μl, and a measurement temperature of 40° C.

A calibration curve is prepared from eight samples of "standard sample TSK standard, polystyrene" manufactured by Tosoh Corporation: "F-40", "F-20", "F-4", F-1", A-5000", "A-2500", "A-1000", and "n-propyl benzene".

From the viewpoint of the self-dispersibility and the aggregation rate in a case where the treatment liquid contacts the coloring material, the polymer dispersant preferably contains a polymer having a carboxyl group. The polymer dispersant is preferably a polymer containing a carboxyl group and having an acid value of equal to or smaller than 130 mg KOH/g, and more preferably a polymer having an acid value of 25 mg KOH/g to 120 mg KOH/g. Particularly, a polymer dispersant is effective which contains a carboxyl group and has an acid value of 25 mg KOH/g to 100 mg KOH/g.

A mixing mass ratio (p:s) of pigment (p):dispersant (s) is preferably within a range of 1:0.06 to 1:3, more preferably within a range of 1:0.125 to 1:2, and even more preferably within a range of 1:0.125 to 1:1.5.

The content of the coating resin coating the pigment with respect to the total mass of the first ink composition is preferably 0.5% by mass to 3.0% by mass, more preferably 1.0% by mass to 2.8% by mass, and even more preferably 1.2% by mass to 2.5% by mass.

From the viewpoint of inhibiting the reduction in viscosity of the ink and inhibiting the graininess of the image, the mass ratio between the coating resin and an inorganic salt which will be described later (coating resin/inorganic salt) is preferably 10 to 250, more preferably 15 to 200, and even more preferably 30 to 150.

The volume-average particle diameter (secondary particle diameter) of the resin-coated pigment (pigment in a dispersed state) is preferably 10 nm to 200 nm, more preferably 10 nm to 150 nm, and even more preferably 10 nm to 100 nm. In a case where the volume-average particle diameter is equal to or smaller than 200 nm, the flexo color reproducibility becomes excellent, and jetting properties at the time of jetting the ink composition by an ink jet method become excellent. In a case where the volume-average particle diameter is equal to or greater than 10 nm, light fastness becomes excellent. The particle size distribution of the resin-coated pigment is not particularly limited, and may be a wide range of particle size distribution or a monodispersed particle size distribution. Furthermore, two or more kinds of resin-coated pigments having a monodispersed particle size distribution may be used by being mixed together. Although the volume-average particle diameter of the resin-coated pigment in a dispersed state mentioned herein refers to an average particle diameter in a state where an ink has been made, regarding a so-called concentrated ink dispersion at the stage before the ink is made, the same volume-average particle diameter is applied.

The volume-average particle diameter of the resin-coated pigment refers to a value determined by the same method as being used for determining the volume-average particle diameter of the aforementioned resin particles.

It is preferable that the resin coating the pigment in the resin-coated pigment is cross-linked by a cross-linking agent.

That is, it is preferable that the resin-coated pigment is a resin-coated pigment in which at least a portion of the surface of a pigment is coated with a resin cross-linked by a cross-linking agent.

Regarding the resin-coated pigment in which at least a portion of the surface of a pigment is coated with a resin cross-linked by a cross-linking agent, it is possible to appropriately refer to the description in paragraphs "0029" to "0048", "0110" to "0118", and "0121" to "0129" in JP2012-162655A and in paragraphs "0035" to "0071" in JP2013-47311A.

The cross-linking agent is not particularly limited as long as it is a compound having two or more moieties reacting with a resin. The cross-linking agent is particularly preferably a compound having two or more epoxy groups (epoxy compound having two or more functional groups), because such a compound excellently reacts with a carboxyl group.

Specific examples of the cross-linking agent include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, trimethylolpropane triglycidyl ether, and the like. Among these, polyethylene glycol diglycidyl ether, diethylene glycol diglycidyl ether, and trimethylolpropane triglycidyl ether are preferable.

Commercially available products can also be used as the cross-linking agent. As the commercially available products, for example, it is possible to use Denacol EX-321, EX-821, EX-830, EX-850, and EX-851 (manufactured by Nagase ChemteX Corporation), and the like.

From the viewpoint of the cross-linking reaction rate and the stability of a dispersion liquid after cross-linking, the molar ratio of cross-linking moiety (for example, an epoxy group) of cross-linking agent:cross-linked moiety (for example, a carboxyl group) of resin is preferably 1:1 to 1:10, more preferably 1:1 to 1:5, and most preferably 1:1 to 1:1.5.

—Acidic Dye—

The acidic dye is not particularly limited and can be appropriately selected according to the purpose. Examples of the acidic dye include an azo dye, an azomethine dye, a xanthene dye, a quinone dye, and the like.

Specifically, examples of the acidic dye include the acidic dyes described in paragraphs "0032" to "0034" in JP2010-94864A.

One kind of acidic dye may be used singly, or two or more kinds thereof may be used in combination.

From the viewpoint of the image density, the content of the acidic dye in the first ink composition with respect to the total mass of the first ink composition is preferably 1% by mass to 20% by mass, and more preferably 2% by mass to 10% by mass.

(Water)

The first ink composition contains water.

The content of water is not particularly limited, but can be, for example, equal to or greater than 50% by mass with respect to the total mass of the first ink composition.

The content of water with respect to the total mass of the first ink composition is preferably equal to or greater than 50% by mass and equal to or smaller than 80% by mass, more preferably equal to or greater than 50% by mass and equal to or smaller than 75% by mass, and even more preferably equal to or greater than 50% by mass and equal to or smaller than 70% by mass.

(Water-Soluble Solvent)

The first ink composition may contain a water-soluble solvent.

In a case where the composition contains a water-soluble solvent, jettability of the ink composition from an ink jet head and the storage stability of the ink composition are further improved.

In the present specification, "water-soluble" means the properties of being able to be dissolved in water at a certain concentration or higher than that. As the "water-soluble" properties, the properties are preferable in which the amount of a substance dissolving in 100 g of water with a temperature of 25° C. is equal to or greater than 5 g (more preferably equal to or greater than 10 g).

As the water-soluble solvent, known water-soluble solvents can be used without particular limitation.

Examples of the water-soluble solvent include glycols such as glycerin, 1,2,6-hexanetriol, trimethylolpropane, ethylene glycol, propylene glycol, diethylene glycol, triethylene glycol, tetraethylene glycol, pentaethylene glycol, and dipropylene glycol, polyhydric alcohols including alkanediol such as 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanedioll, sugars or sugar alcohols, hyaluronic acids, alkyl alcohols having 1 to 4 carbon atoms, glycol ethers, 2-pyrrolidone, and N-methyl-2-pyrrolidone described in paragraph "0116" in JP2011-

42150A, and the like. Among these solvents, one kind or two or more kinds can be appropriately selected and used. Polyhydric alcohols are useful as an anti-drying agent or a wetting agent, and examples thereof include those described in paragraph "0117" in JP2011-42150A. Furthermore, a polyol compound is preferred as a penetrant, and examples of aliphatic diols include those described in paragraph "0117" in JP2011-42150A.

In addition, other water-soluble solvents can be appropriately selected from the water-soluble solvents described in paragraphs "0176" to "0179" in JP2011-46872A and the water-soluble solvents described in paragraphs "0063" to "0074" in JP2013-18846A.

The content of the water-soluble solvent in the first ink composition (total amount in a case where two or more kinds of water-soluble solvents are used) with respect to the total mass of the first ink composition is preferably 10% by mass to 60% by mass.

In a case where the total amount of the water-soluble solvent is equal to or greater than 10% by mass, the jettability of the ink composition from a head and the storage stability are further improved.

The total amount of the water-soluble solvent with respect to the total mass of the first ink composition is more preferably 15% by mass to 55% by mass, and even more preferably 20% by mass to 50% by mass.

(Surfactant)

If necessary, the first ink composition can contain at least one kind of surfactant. The surfactant can be used as a surface tension adjuster, for example.

As the surfactant, it is possible to effectively use a compound having a structure including both the hydrophilic portion and the hydrophobic portion in a molecule, and to use any of an anionic surfactant, a cationic surfactant, an amphoteric surfactant, a nonionic surfactant, and a betaine-based surfactant. Furthermore, the aforementioned polymer dispersant may be used as a surfactant. In addition, a fluorine-based surfactant can also be preferably used.

From the viewpoint of inhibiting jetting interference of the ink droplets, as the surfactant, a nonionic surfactant is preferable, and an acetylene glycol derivative (acetylene glycol-based surfactant) is particularly preferable.

Examples of the acetylene glycol-based surfactant include alkylene oxide adducts such as 2,4,7,9-tetramethyl-5-decyne-4,7-diol and 2,4,7,9-tetramethyl-5-decyne-4,7-diol, and at least one kind of surfactant selected from these is preferable. Examples of commercially available products of these compounds include an E-series such as OLEFIN E1010 and a SURFYNOL (registered trademark) series manufactured by Nissin Chemical Co., Ltd., and the like.

As surfactants other than the acetylene glycol-based surfactant, a fluorine-based surfactant is preferable. Examples of the fluorine-based surfactant include an anionic surfactant, a nonionic surfactant, and a betaine-based surfactant, and among these, an anionic surfactant is more preferable. Examples of the anionic surfactant include Capstone FS-63 and Capstone FS-61 (manufactured by DuPont), FTERGENT 100, FTERGENT 110, and FTERGENT 150 (manufactured by NEOS COMPANY LIMITED), CHEMGUARD S-760P (manufactured by Chemguard Inc.), and the like.

In a case where the first ink composition contains a surfactant (surface tension adjuster), from the viewpoint of excellently jetting the first ink composition by an ink jet method, the content of the surfactant in the first ink composition is preferably set within such a range that the surface tension of the first ink composition can be adjusted to become 20 mN/m to 60 mN/m. The surface tension is more preferably 20 mN/m to 45 mN/m, and even more preferably 25 mN/m to 40 mN/m.

The surface tension of the first ink composition refers to a value measured using an Automatic Surface Tensiometer CBVP-Z (manufactured by Kyowa Interface Science Co., LTD.) under the condition of a liquid temperature of 25° C. (±1° C.).

In a case where the first ink composition contains a surfactant, the specific amount of the surfactant is not particularly limited. The amount of the surfactant with respect to the total mass of the first ink composition is preferably equal to or greater than 0.1% by mass, more preferably 0.1% by mass to 10% by mass, and even more preferably 0.2% by mass to 3% by mass.

(Urea)

The first ink composition can contain urea.

Urea performs an excellent moisturizing function. Therefore, as a solid wetting agent, urea can effectively inhibit undesirable drying or coagulation of the ink.

Furthermore, in a case where the first ink composition contains colloidal silica and urea, the maintenance properties (wiping properties) of an ink jet head and the like are more effectively improved.

From the viewpoint of improving the maintenance properties (wiping properties) and the like, the content of urea in the first ink composition with respect to the total mass of the ink composition is preferably equal to or greater than 1% by mass and equal to or smaller than 20% by mass, more preferably equal to or greater than 1% by mass and equal to or smaller than 15% by mass, and even more preferably equal to or greater than 3% by mass and equal to or smaller than 10% by mass.

In a case where the first ink composition contains urea and colloidal silica which will be described later, a ratio between the content of urea and the content of colloidal silica is not particularly limited. However, the ratio of the content of urea to the content of colloidal silica (urea/colloidal silica) is preferably 5 to 1,000, more preferably 10 to 500, and even more preferably 20 to 200, based on mass.

In a case where the first ink composition contains urea and colloidal silica, the combination of the content of urea and the content of colloidal silica is not particularly limited. However, from the viewpoint of effectively achieving both the wiping properties and the image fixing properties, the following combination is preferable.

That is, a combination is preferable in which the content of urea is equal to or greater than 1.0% by mass and the content of colloidal silica is equal to or greater than 0.01% by mass, a combination is more preferable in which the content of urea is 1.0% by mass to 20% by mass and the content of colloidal silica is 0.02% by mass to 0.5% by mass, and a combination is particularly preferable in which the content of urea is 3.0% by mass to 10% by mass and the content of colloidal silica is 0.03% by mass to 0.2% by mass.

(Colloidal Silica)

If necessary, the first ink composition may contain colloidal silica.

In a case where the first ink composition contains colloidal silica, it is possible to further improve the stability at the time of continuously jetting the ink.

The colloidal silica is a colloid formed of fine particles of an inorganic oxide containing silicon having an average particle diameter of equal to or smaller than hundreds of nanometers. The colloidal silica contains silicon dioxide (including a hydrate thereof) as a main component, and may contain aluminate (sodium aluminate, potassium aluminate, or the like) as a trace component.

Furthermore, the colloidal silica may contain inorganic salts such as sodium hydroxide, potassium hydroxide, lithium hydroxide, and ammonium hydroxide or organic salts such as tetramethylammonium hydroxide. These inorganic salts and organic salts function as a stabilizer for the colloid, for example.

Regarding the colloidal silica, for example, it is possible to appropriately refer to the description in paragraphs "0043" to "0050" in JP2011-202117A.

If necessary, the first ink composition may contain an alkali metal salt of silicic acid instead of or in addition to the colloidal silica. Regarding the alkali metal salt of silicic acid, it is possible to appropriately refer to the description in paragraphs "0052" to "0056" in JP2011-202117A.

In a case where the first ink composition contains the colloidal silica, the content of the colloidal silica with respect to the total mass of the first ink composition is preferably 0.0001% by mass to 10% by mass, more preferably 0.01% by mass to 3% by mass, even more preferably 0.02% by mass to 0.5% by mass, and particularly preferably 0.03% by mass to 0.3% by mass.

(Water-Soluble Polymer Compound)

If necessary the first ink composition may contain at least one kind of water-soluble polymer compound.

The water-soluble polymer compound is not particularly limited, and it is possible to use known water-soluble polymer compounds such as polyvinyl alcohol, polyacrylamide, polyvinyl pyrrolidone, and polyethylene glycol.

As the water-soluble polymer compound, specific polymer compounds that can be contained in the treatment liquid or the water-soluble polymer compounds described in paragraphs "0026" to "0080" in JP2013-001854A are also suitable.

In a case where the first ink composition contains the water-soluble polymer compound, the content of the water-soluble polymer compound with respect to the total mass of the first ink composition is preferably 0.0001% by mass to 10% by mass, more preferably 0.01% by mass to 3% by mass, even more preferably 0.02% by mass to 0.5% by mass, and particularly preferably 0.03% by mass to 0.3% by mass.

(Antifoaming Agent)

If necessary, the first ink composition may contain at least one kind of antifoaming agent.

Examples of the antifoaming agent include a silicone-based compound (silicone-based antifoaming agent), a Pluronic-based compound (Pluronic-based antifoaming agent), and the like. Among these, a silicone-based antifoaming agent is preferable.

As the silicone-based antifoaming agent, a silicone-based antifoaming agent having a polysiloxane structure is preferable.

As the antifoaming agent, commercially available products can be used.

Examples of the commercially available products include BYK-012, 017, 021, 022, 024, 025, 038, and 094 (manufactured by BYK-Chemie Japan K.K.), KS-537, KS-604, and KM-72F (manufactured by Shin-Etsu Chemical Co., Ltd.), TSA-739 (manufactured by Momentive Performance Materials Japan LLC), OLFINE AF104 (manufactured by Nissin Chemical Co., Ltd.), and the like.

Among these, BYK-017, 021, 022, 024, 025, and 094, KS-537, KS-604, KM-72F, and TSA-739 as silicone-based antifoaming agents are preferable. Among these, in view of jetting stability of the ink, BYK-024 is most preferable.

In a case where the first ink composition contains the antifoaming agent, the content of the antifoaming agent with respect to the total mass of the ink composition is preferably 0.0001% by mass to 1% by mass, and more preferably 0.001% by mass to 0.1% by mass.

(Inorganic Salt)

If necessary, the first ink composition may contain at least one kind of inorganic salt.

In a case where the first ink composition contains an inorganic salt, the graininess of the formed image is suppressed.

The graininess refers to a phenomenon in which within a region (halftone region) that is in between a region (highlight) where the image is bright and a region (shadow) where the image is dark, a portion with a high density of the ink composition and a portion with a low density of the ink composition are localized, and hence the image looks rough.

"Graininess" is not a phenomenon that occurs due to the local insufficient aggregation of the ink composition similarly to "bleed" or "streak" in the related art, but a phenomenon resulting from uneven aggregation that occurs due to the non-uniform distribution of the treatment liquid on the substrate.

As the inorganic salt, a hydrochloride or a nitrate is preferable.

Among these, a monovalent salt is preferable because this salt excellently inhibits the reduction in viscosity of the ink and excellently suppress the graininess, an alkali metal salt is more preferable, and lithium chloride, lithium nitrate, potassium chloride, or lithium nitrate is even more preferable.

One kind of inorganic salt can be used singly, or two or more kinds thereof can be used in combination.

In a case where the first ink composition contains an inorganic salt, the content of the inorganic salt (total content in a case where two or more kinds of inorganic salts are used) in the first ink composition is not particularly limited. The content of the inorganic salt with respect to the total mass of the first ink composition is preferably 0.01% by mass to 0.1% by mass, more preferably 0.02% by mass to 0.1% by mass, and particularly preferably 0.03% by mass to 0.1% by mass.

(Other Components)

If necessary, the first ink composition may contain other components in addition to the aforementioned components.

Examples of other components include known additives such as a solid wetting agent, an antifading agent, an emulsification stabilizer, a penetration enhancer, an ultraviolet absorber, a preservative, a fungicide, a pH adjuster, a viscosity adjuster, a rust inhibitor, and a chelating agent.

(Preferred Physical Properties of Ink Composition)

The physical properties of the first ink composition are not particularly limited, but are preferably as below.

From the viewpoint of the aggregation rate and the dispersion stability of the composition, the pH of the first ink composition at 25° C. (±1° C.) is preferably equal to or higher than 7.5.

The pH (25° C.±1° C.) of the first ink composition is preferably pH 7.5 to pH 13, and more preferably pH 7.5 to pH 10. The pH is a value measured using a pH meter WM-50EG (manufactured by DKK-TOA CORPORATION) under the condition of 25° C. (±1° C.).

From the viewpoint of the aggregation rate, the viscosity of the first ink composition is preferably within a range of 0.5 mPa·s to 20 mPa·s, and more preferably within a range of 4 mPa·s to 15 mPa·s.

The viscosity is a value measured using a VISCOMETER TV-22 (manufactured by TOKI SANGYO CO., LTD) under the condition of 25° C. (±1° C.).

The surface tension of the first ink composition at 25° C. (±1° C.) is preferably equal to or lower than 60 mN/m, more preferably 18 mN/m to 50 mN/m, and even more preferably 20 mN/m to 45 mN/m. For the flexo color reproducibility, it is advantageous for the surface tension of the first ink composition to be within the above range, because then the liquid droplets having landed appropriately spread on the substrate. The surface tension is a value measured using an Automatic Surface Tensiometer CBVP-Z (manufactured by Kyowa Interface Science Co., LTD.) under the condition of 25° C. (±1° C.) by using a plate method.

<Ink Jet Method>

In the first ink applying step, the first ink composition is applied by an ink jet method under the condition of an amount of a liquid droplet of equal to or greater than 10 picoliters.

By applying the first ink composition in an amount of a liquid droplet of equal to or greater than 10 picoliters, even in a case where the corrugated cardboard substrate and the ink jet head are spaced far apart, the landing interference of the ink composition can be inhibited, and the occurrence of mottling resulting from the merging of the liquid droplets can be inhibited. Even in a case where a head with a low nozzle density is used as the ink jet head, high flexo color reproducibility can also be achieved.

The application of the first ink composition by an ink jet method is performed by jetting the ink composition onto a desired substrate by means of supplying energy. As an ink jet method preferred in the present invention, it is possible to use the method described in paragraphs "0093" to "0105" in JP2003-306623A.

The ink jet method is not particularly limited, and may be any of known methods, for example, an electric charge control method in which an ink is jetted by using electrostatic attraction force, a drop-on-demand method (a pressure pulse method) of using vibration pressure of a piezoelectric element, an acoustic ink jet method in which an ink is irradiated with an acoustic beam converted from an electric signal and jetted by using the radiation pressure; and a thermal ink jet (Bubble Jet (registered trademark)) method in which air bubbles are formed by heating an ink and the thus generated pressure is used; and the like. As the ink jet method, particularly, it is possible to effectively use an ink jet method in which an ink undergoes a dramatic volume change by being affected by thermal energy through the method described in JP1979-59936A (JP-S54-59936A), and the ink is jetted from nozzles by an acting force resulting from the change of state.

As ink jet heads, there is an ink jet head used for a shuttle method of using a short serial head, in which recording is performed while a substrate is being scanned in a width direction by the head, and an ink jet head used for a line method (single-pass printing method) of using a line head in which recording elements are arranged to correspond to the entire region of one side of a substrate. In the line method, the substrate is scanned in a direction orthogonal to the arrangement direction of the recording elements, and accordingly, an image can be recorded on the entire surface of the substrate, and a transport system such as a carriage scanning the short head is not required. Moreover, complicated scanning control for moving a carriage and a substrate is not required, and only the substrate is moved. Therefore, in the line method, the recording rate can be further increased than in the shuttle method.

Because productivity is required, it is preferable that the formation of an image on a corrugated cardboard substrate is performed by a single-pass printing method. The printing rate is preferably equal to or higher than 50 m/min, and more preferably equal to or higher than 100 m/min.

The method for forming an image of a corrugated cardboard substrate include a post-printing method in which an image is formed on a corrugated cardboard obtained by bonding paper (corrugating medium) processed to become wavy to a liner. From the viewpoint of preventing the loss of paper, this method is preferable.

In a case where the post-printing method is used, due to bonding, asperities occur on the printing surface having undergone bonding, or the printing surface becomes non-smooth due to the warping of the substrate. Therefore, the interval between the ink jet head and the recording surface of the substrate is preferably equal to or greater than 3 mm, more preferably equal to or greater than 5 mm, and particularly preferably equal to or greater than 10 mm.

As described above, in a case where an image is formed at high speed and the ink jet head and the recording surface of the substrate are spaced far apart, in a case where the amount of ink jetted from the ink jet head is small, the ink lands on wrong positions, and hence an excellent image cannot be formed. Therefore, the amount of the liquid droplets is preferably equal to or greater than 10 picoliters, and more preferably equal to or greater than 25 picoliters. From the viewpoint of the graininess of the portion with a low density, the upper limit of the amount of the liquid droplets is preferably equal to or smaller than 80 picoliters, and more preferably equal to or smaller than 40 picoliters.

In a case where the upper limit of the amount of the liquid droplets is equal to or smaller than 80 picoliters, an excess of liquid droplets are not applied to the recording surface of the substrate, and the occurrence of mottling is inhibited.

In order to form an image by the single-pass printing method which is a preferred aspect of the image forming method, the head is disposed orthogonal to the transport direction of paper. Accordingly, the nozzle density (nozzle per inch (npi)) of the ink jet head becomes the same as the printing density (dot per inch (dpi)) in the direction orthogonal to the transport direction of paper. Consequently, the nozzle density of the ink jet head, which is used in an embodiment of the present invention so as to avoid the occurrence of mottling described above, is preferably equal to or smaller than 600 nozzles per inch (600 npi), and more preferably equal to or less than 400 nozzles per inch (400 npi).

As methods for achieving the aforementioned nozzle density, for example, the following methods can be considered which include 1) method of using an ink jet head having a nozzle density within a preferred range, 2) method in which ink jet heads having a nozzle density equal to or lower than a nozzle density within a preferred range are used in combination, 3) method in which an ink jet head having a nozzle density equal to or lower than a preferred nozzle density is obliquely disposed with respect to the transport direction of paper such that the adjacent nozzles become close to a direction orthogonal to the transport direction of paper, and 4) method in which a head having a nozzle density equal to or higher than a nozzle density within a preferred range is used such that only necessary nozzles are used. From the viewpoint of reducing the cost of the device, it is preferable to use the method 1), 2), or 3).

Examples of heads preferably used in the image forming method of the present invention include an SG1024 head (manufactured by Fujifilm Dimatix, Inc: 400 npi), a QE head (manufactured by Fujifilm Dimatix, Inc: 100 npi), a QS head (manufactured by Fujifilm Dimatix, Inc: 100 npi), and a Polaris head (manufactured by Fujifilm Dimatix, Inc: 200 npi). The SG1024 head is preferably used in the method 1), the QE head and the QS head are preferably used in the methods 2) and 3), and the Polaris head is preferably used in the method 2). These heads include lineups in which the heads have a minimum amount of a liquid droplet of 10 picoliters, 30 picoliters, and 80 picoliters. It is preferable to use the heads having a minimum amount of a liquid droplet of 30 picoliters.

Particularly, in the image forming method of an embodiment of the present invention, an aspect is preferable in which the nozzle density of the head is equal to or lower than 600 npi and the first ink composition is applied in an amount of a liquid droplet of equal to or greater than 10 picoliters, and an aspect is more preferable in which the nozzle density of the head is equal to or lower than 400 npi and the first ink composition is applied in an amount of a liquid droplet of equal to or greater than 25 picoliters and equal to or smaller than 40 picoliters.

From the viewpoint of the flexo color reproducibility, in the first ink applying step, the first ink composition is applied preferably at a dot area rate of equal to or higher than 100%, more preferably at a dot area rate of equal to or higher than 100% and equal to or lower than 400%, and even more preferably at a dot area rate of equal to or higher than 100% and equal to or lower than 250%.

The dot area rate means a rate determined by expressing a proportion of an area of dots per unit area by a percentage.

[Second Ink Applying Step]

The image forming method includes a second ink applying step of applying a second ink composition, which contains a resin, a wax, and water and in which in which a content of a coloring material is equal to or smaller than 0.5% by mass with respect to a total mass of the second ink composition, onto the first ink composition applied to the corrugated cardboard substrate.

By applying the second ink composition onto the corrugated cardboard substrate onto which the first ink composition is applied, an image having excellent rub resistance is formed.

<Second Ink Composition>

The second ink composition contains a resin, a wax, and water, in which the content of a coloring material is equal to or smaller than 0.5% by mass with respect to the total mass of the ink composition.

Because the second ink composition contains a resin and a wax, rub resistance is imparted to the formed image.

The content of each of the resin and the wax in the second ink composition with respect to the total mass of the second ink composition is preferably equal to or greater than 2% by mass, more preferably equal to or greater than 3% by mass, and particularly preferably equal to or greater than 4% by mass. In a case where the content of each of the resin and the wax is equal to or greater than 1% by mass, the rub resistance of the image is further improved.

The content of the coloring material in the second ink composition with respect to the total mass of the ink composition is equal to or smaller than 0.5% by mass, preferably equal to or smaller than 0.1% by mass, and particularly preferably 0% by mass (the ink composition particularly preferably does not contain the coloring material).

(Resin)

The second ink composition contains at least one kind of resin. In a case where the second ink composition contains a resin, the rub resistance of the image is further improved.

As described above, the resin means a polymer compound which does not have a melting point or has a melting point of higher than 170° C. unlike a wax. It is preferable that the resin has a glass transition temperature (Tg).

From the viewpoint of the dispersion stability of the resin in the ink composition, it is preferable that the resin is contained in the ink composition in the form of particles. That is, it is preferable that the resin is contained in the ink composition in the form of resin particles. Furthermore, in a case where the ink composition contains a resin, latex may be used.

Examples of the resin include resins selected from thermoplastic resins and thermosetting resins.

These resins may be modified resin.

Examples of the resin include an acrylic resin, an epoxy resin, a urethane resin, a polyether resin, a polyamide resin, an unsaturated polyester resin, a phenol resin, a silicone resin, a fluorine resin, a polyvinyl resin (for example, vinyl chloride, vinyl acetate, polyvinyl alcohol, polyvinyl butyral, or the like), an alkyd resin, a polyester resin (for example, a phthalic acid resin or the like), an amino material (for example, a melamine resin, a melamine formaldehyde resin, an amino-alkyd cocondensate resin, a urea resin, a urea formaldehyde resin, or the like), and the like.

Furthermore, the resin may be a copolymer containing two or more constitutional units constituting the resin exemplified above, or a mixture of two or more kinds of resins.

In the second ink composition, only one kind of resin may be used, or two or more kinds of resins may be used in combination.

Among the above, as the resin, particles of a urethane resin, an acrylic resin, a polyether resin, a polyester resin, or a polyolefin resin are preferable. From the viewpoint of the stability and the quality of the formed film (image), a urethane resin or an acrylic resin is more preferable, and a urethane resin is particularly preferable.

—Urethane Resin—

The urethane resin is formed of a urea moiety which can have a strong interaction such as hydrogen bonding with polymers and a non-urethane moiety which have a relatively weak interaction with polymers. Presumably, when the ink is formed into a film, the urethane resin may establish, as a microstructure, a sea-island structure in which the moieties having a relatively strong interaction and the moieties having a relatively weak interaction gather respectively, and due to this structure, urethane may have flexibility.

It is preferable that the urethane resin is a polymer having a structure derived from a diisocyanate compound and a structure derived from a diol compound.

The method for preparing the urethane resin is not particularly limited, but it is preferable that the urethane resin is prepared by urethanating a diisocyanate compound and a diol compound in an organic solvent. From the viewpoint of the water dispersibility of the ink and the affinity between the ink composition and a recording medium, it is more preferable that the urethane resin is prepared by causing a urethanating reaction of a diisocyanate compound, a diol compound, and an organic salt of a diol compound containing a carboxyl group in an organic solvent. In this case, as the diisocyanate compound, it is possible to use various known diisocyanate compounds such as aliphatic, aromatic, and alicyclic diisocyanate compounds.

Specific examples of the diisocyanate compound include aromatic diisocyanate such as 2,4-tolylene diisocyanate, 2,6-tolylene diisocyanate, 1,5-naphthylene diisocyanate, 4,4'-diphenylmethane diisocyanate, m-phenylene diisocyanate, xylylene diisocyanate, 4,4'-diphenyldimethylmethane diisocyanate, and 4,4'-dibenzyl isocyanate, aliphatic or alicyclic diisocyanate such as tetramethyl ene diisocyanate, hexamethyl ene diisocyanate, 1,4-dicyclohexylmethane diisocyanate, and isophorone diisocyanate, and the like.

Specific examples of the diol compound include polyether compounds such as polyethylene glycol, polypropylene glycol, and polytetramethylene glycol, polyesters obtained by a dehydrocondensation between a polyhydric alcohol such as ethylene glycol, propanediol, butanediol, pentanediol, hexanediol, neopentyl diol, or cyclohexane dimethanol and a polyvalent carboxylic acid such as maleic acid, succinic acid, glutaric acid, adipic acid, sebacic acid, dodecanedioic acid, terephthalic acid, isophthalic acid, or naphthalene dicarboxylic acid or obtained by a ring-opening polymerization reaction of a cyclic ester such as caprolactone or pivalolactone, ethylene adducts or propylene oxide adducts of diol polycarbonate, ethylene glycol, triethylene glycol, 1,2-propylene glycol, 1,3-propanediol, 1,3-butylene glycol, 1,4-butanediol, 1,6-hexanediol, and hydrogenated bisphenol A, a low-molecular weight glycol such as ethylene oxide of bisphenol S, polyethers such as polyethylene glycol, polypropylene glycol, and polytetramethylene glycol, and the like.

It is preferable that the diol compound has at least one structure among a polyether structure, a polyester structure, and a polycarbonate structure.

It is more preferable that the diol compound has a structure derived from diol polycarnonate. The diol polycarbonate is generated through reactions such as a demethanolation condensation reaction between a polyhydric alcohol and dimethyl carbonate, a dephenolation condensation reaction between a polyhydric alcohol and diphenyl carbonate, and a de-ethylene glycolation condensation reaction between a dialcohol and ethylene carbonate. Examples of polyhydric alcohols usable in these reactions include various saturated or unsaturated glycols such as 1,6-hexanediol, diethylene glycol, triethylene glycol, propylene glycol, 1,3-butanediol, 1,4-butanediol, neopentyl glycol, pentanediol, 3-methyl-1,5-pentanediol, octanediol, 1,4-butynediol, dipropylene glycol, tripropylene glycol, and polytetramethylene ether glycol, alicyclic glycols such as 1,4-cyclohexane diglycol and 1,4-cyclohexane dimethanol, and the like.

Examples of other diol compounds include, in addition to the above, polycaprolactone containing a hydroxyl group (polycaprolactone diol), a hydroxyl group-containing acryl polymer, hydroxyl group-containing epoxide, polyhydroxypolyacetal, polyhydroxypolythioether, polysiloxane polyol, epoxylated polysiloxane polyol, polybutadiene polyol, hydrogenated polybutadiene polyol, polyisobutylene polyol, polyacrylate polyol, halogenated polyester and polyether, and the like.

Among the above diol compounds, polyethers such as diol polycarbonate, hydroxyl group-containing polycaprolactone, low-molecular weight glycol, polyethylene glycol, polypropylene glycol, and polytetramethyl glycol are preferable, diol polycarbonate, hydroxyl group-containing polycaprolactone, polypropylene glycol, and polymethylene glycol are more preferable, and diol polycarbonate is particularly preferable.

In addition, a diol compound containing a carboxyl group can be incorporated into the urethane resin as a constitutional component imparting water solubility. From the viewpoint of enhancing the water dispersibility in a case where the urethane resin is made into particles, specific examples of the diol compound containing a carboxyl group include dimethylolpropionic acid (DMPA) which is a compound derived from a hydroxycarboxylic acid, dimethylol butanoic acid (DMBA), citric acid, tartaric acid, glycolic acid, lactic acid, malic acid, dihydroxymalic acid, dihydrocytartaric acid, and a mixture of these.

Among these, dimethylolpropionic acid (DMPA) and dimethylol butanoic acid (DMBA) are preferable.

From the viewpoint of improving the dispersibility in a case where the urethane resin is made into particles, it is preferable that the urethane resin is made into a salt by adding a neutralizer that functions as a counterion of the urethane resin in the solution. The salt is not particularly limited, and includes inorganic salts and organic salts (for example, a hydroxide and an oxide of an alkali metal and an alkali earth metal, a carbonate and a hydrocarbon salt of these, an ammonia salt, and a primary, secondary, or tertiary amine salt). Among these, from the viewpoint of the rub resistance, an organic salt having an organic cation as a counterion is preferable. Examples of the organic salt include organic amine salts such as salts of trimethylamine, triethylamine, tripropylaamine, tributylammonium, triethanolamine, monoethanolamine, N-methylmorpholine, morpholine, 2,2-dimethylmonoethanolamine, N,N-diemethylethanolamine, pyridine, and dimethylaminopyridine. Among these, organic amine salts are preferable, salts of triethylamine, pyridine, dimethylaminopyridine, tributylammonium are more preferable, and a triethylamine salt having a triethylamine cation as a counterion is most preferable.

In view of the water dispersibility of the ink, it is preferable that the urethane resin contains a structure derived from a diisocyanate compound, a structure derived from a diol compound, and a structure derived from an organic salt of a diol compound containing a carboxyl group.

The acid value of the urethane resin is preferably 10 mmol/g to 200 mmol/g, more preferably 10 mmol/g to 100 mmol/g, and most preferably 30 mmol/g to 80 mmol/g. In a case where the acid value is equal to or greater than 10 mmol/g, the dispersibility of the urethane resin particles can be improved. In a case where the acid value is equal to or smaller than 200 mmol/g, the rub resistance of the image can be improved.

The acid value is represented by the number of moles of potassium hydroxide necessary for neutralizing 1 gram (g) of the resin particles. That is, the acid value is a value determined by the measurement method specified by JIS (JIS K0070:1992).

The weight-average molecular weight of the urethane resin is not particularly limited, but is preferably 10,000 to 200,000, more preferably 30,000 to 150,000, and even more preferably 50,000 to 120,000. In a case where the weight-average molecular weight is equal to or greater than 10,000, high rub resistance can be obtained. In a case where the weight-average molecular weight is equal to or smaller than 200,000, high flexibility can be obtained.

The weight-average molecular weight can be measured by the aforementioned method.

From the viewpoint of the dispersibility in the second ink composition, it is preferable that the urethane resin is in the form of particles. In a case where the second ink composition is applied by an ink jet method, it is preferable that the urethane resin is in the form of particles, because then the jettability is improved.

—Acrylic Resin—

In the present specification, an acrylic resin means a resin containing a constitutional unit derived from (meth)acrylic acid. The acrylic resin may contain a constitutional unit other than the constitutional unit derived from (meth)acrylic acid.

The acrylic resin is not particularly limited as long as it is a resin having a constitutional unit derived from (meth) acrylic acid.

As the acrylic resin, an aspect in which a constitutional unit having an alicyclic group is changed to a constitutional unit having an aromatic group or an aspect in which the acrylic resin contains a constitutional unit derived from an aromatic group in addition to a constitutional unit having an alicyclic group is preferable.

In any of the aspects, the total content of the constitutional unit having an alicyclic group and the constitutional unit having an aromatic group with respect to the total mass of the polymer is preferably 3% by mass to 95% by mass, more preferably 5% by mass to 75% by mass, and even more preferably 10% by mass to 50% by mass.

Examples of the constitutional unit having an alicyclic group include monocyclic (meth)acrylate, bicyclic (meth) acrylate, and tricyclic (meth)acrylate.

Examples of the monocyclic (meth)acrylate include cycloalkyl (meth)acrylate containing a cycloalkyl group having 3 to 10 carbon atoms, such as cyclopropyl (meth) acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, and cyclodecyl (meth)acrylate.

Examples of the bicyclic (meth)acrylate include isobornyl (meth)acrylate, norbornyl (meth)acrylate, and the like.

Examples of the tricyclic (meth)acrylate include adamantyl (meth)acrylate, dicyclopentanyl (meth)acrylate, dicyclopentenyl oxyethyl (meth)acrylate, and the like.

One kind of each of these constitutional units can be used singly, or two or more kinds thereof can be used by being mixed together.

Among these, from the viewpoint of the fixing properties, the blocking resistance, and the dispersion stability of the self-dispersing polymer particles, bicyclic (meth)acrylate or tricyclic (meth)acrylate is preferable, and isobornyl (meth) acrylate, adamantyl (meth)acrylate, or dicyclopentanyl (meth)acrylate is more preferable.

The constitutional unit having an aromatic group is preferably a constitutional unit derived from an aromatic group-containing monomer.

Examples of the aromatic group-containing monomer include an aromatic group-containing (meth)acrylate monomer (for example, phenoxyethyl (meth)acrylate, benzyl (meth)acrylate, phenyl (meth)acrylate, or the like), a styrene-based monomer, and the like.

Among these, from the viewpoint of the balance between hydrophilicity and hydrophobicity of the polymer chain and the fixing properties of the ink, an aromatic group-containing (meth)acrylate monomer is preferable, phenoxyethyl (meth)acrylate, benzyl (meth)acrylate, or phenyl (meth) acrylate is more preferable, and phenoxyethyl (meth)acrylate or benzyl (meth)acrylate is even more preferable.

The constitutional unit having an alkyl group is preferably a constitutional unit derived from an alkyl group-containing monomer.

Examples of the alkyl group-containing monomer include alkyl (meth)acrylate such as methyl (meth)acrylate, ethyl (meth)acrylate, isopropyl (meth)acrylate, n-propyl (meth) acrylate, n-butyl (meth)acrylate, isobutyl (meth)acrylate, t-butyl (meth)acrylate, hexyl (meth)acrylate, and ethylhexyl (meth)acrylate; ethylenically unsaturated monomers having a hydroxyl group such as hydroxymethyl (meth)acrylate, 2-hydroxyethyl (meth)acrylate, 2-hydroxypropyl (meth) acrylate, 4-hydroxybutyl (meth)acrylate, hydroxypentyl (meth)acrylate, and hydroxyhexyl (meth)acrylate; dialkylaminoalkyl (meth)acrylate such as dimethylaminoethyl (meth)acrylate; N-hydroxyalkyl (meth)acrylate such as N-hydroxymethyl (meth)acrylate, N-hydroxyethyl (meth) acrylate, and N-hydroxybutyl (meth)acrylate; (meth)acrylamide such as N-alkoxyalkyl (meth)acrylamide including N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso)butoxyethyl (meth)acrylamide, and the like.

Among these, alkyl (meth)acrylate is preferable, alkyl (meth)acrylate containing an alkyl group having 1 to 4 carbon atoms is more preferable, methyl (meth)acrylate, ethyl (meth)acrylate, isopropyl (meth)acrylate, or butyl (meth)acrylate is even more preferable, and methyl (meth) acrylate is still more preferable.

As specific examples of the acrylic resin, example compounds P-1 to P-5 will be shown below, but the present invention is not limited thereto. The numbers in the parenthesis represent a mass ratio between the copolymerized components.

P-1: methyl methacrylate/isobornyl methacrylate/methacrylic acid copolymer (70/20/10)

P-2: methyl methacrylate/isobornyl methacrylate/methacrylic acid copolymer (48/42/10)

P-3: methyl methacrylate/benzyl methacrylate/methacrylic acid copolymer (65/25/10)

P-4: isopropyl methacrylate/isobornyl methacrylate/methacrylic acid copolymer (50/40/10)

P-5: butyl methacrylate/dicyclopentanyl methacrylate/methacrylic acid copolymer (60/30/10)

It is preferable that the acrylic resin is used in the form of particles. The acrylic resin is more preferably resin particles obtained by a phase-transfer emulsification method, and more preferably particles of a self-dispersing polymer (self-dispersing polymer particles) described below.

The self-dispersing polymer refers to a water-insoluble polymer which can be in a dispersed state in an aqueous medium due to a functional group (particularly, an acidic group such as a carboxyl group or a salt thereof) the polymer has, in a case where the polymer is allowed to be in a dispersed state by a phase-transfer emulsification method in the absence of a surfactant.

The dispersed state mentioned herein includes both an emulsified state (emulsion) in which the water-insoluble polymer is dispersed in an aqueous medium in a liquid state and a dispersed state (suspension) in which the water-insoluble polymer is dispersed in an aqueous medium in a solid state.

"Water-insoluble" means that the amount of the polymer dissolving in 100 parts by mass of water (25° C.) is equal to or smaller than 5.0 parts by mass.

Examples of the phase-transfer emulsification method include a method in which a polymer is dissolved or dispersed in a dissolvent (for example, a water-soluble solvent) and then added to water as it is without the addition of a surfactant, stirring and mixing are performed in a state where the salt-generating group (for example, an acidic group) contained in the polymer is neutralized, the dissolvent is removed, and then an aqueous dispersion in an emulsified or dispersed state is obtained.

As the self-dispersing polymer particles, it is possible to use polymer particles selected from the self-dispersing polymer particles described in paragraphs "0090" to "0121" in JP2010-64480A or in paragraphs "0130" to "0167" in JP2011-068085A. Particularly, among the self-dispersing polymer particles described in the aforementioned publications, it is preferable to select and use the polymer particles having a glass transition temperature of equal to or higher than 100° C.

~Physical Properties of Resin~

From the viewpoint of the rub resistance of an image, the glass transition temperature (Tg) of the resin is preferably equal to or higher than 40° C.

The upper limit of the glass transition temperature of the resin is preferably 250° C.

The glass transition temperature of the resin is preferably within a range of equal to or higher than 50° C. and equal to or lower than 230° C.

The glass transition temperature of the resin can be appropriately controlled by generally used methods. For example, by appropriately selecting the type of monomer (polymerizable compound) constituting the resin, the constitutional proportion of the monomer, the molecular weight of the polymer constituting the resin, and the like, the glass transition temperature of the resin can be adjusted within an intended range.

In the present specification, as the glass transition temperature of the resin, a measurement Tg obtained by actual measurement is used.

Specifically, the measurement Tg means a value measured using a differential scanning calorimetry (DSC) EXSTAR 6220 manufactured by Hitachi High-Tech Science Corporation under the normal measurement conditions. Here, in a case where it is difficult to measure the Tg by the analysis of a polymer or the like, a calculation Tg calculated by the following equation is used. The calculation Tg is calculated by the following Equation (1).

$$1/Tg = \Sigma(Xi/Tgi) \tag{1}$$

Herein, the polymer to as a calculation target is regarded as a compound in which n kinds of monomer components including the ith (i=1) to nth components are copolymerized. Xi represents a weight fraction of the ith monomer ($\Sigma Xi=1$), and Tgi represents a glass transition temperature (absolute temperature) of a homopolymer of the ith monomer. Here, $\Sigma$ represents the sum of the numbers from i (i=1) to n. As the value (Tgi) of the glass transition temperature of the homopolymer of each monomer, the value in Polymer Handbook (3rd Edition) (J, Brandrup, E. H. Immergut (Wiely-Interscience, 1989)) is adopted.

The weight-average molecular weight of the polymer constituting the resin is preferably 3,000 to 200,000, more preferably 5,000 to 150,000, and even more preferably 10,000 to 100,000.

In a case where the weight-average molecular weight is equal to or greater than 3,000, it is possible to effectively control the amount of the water-soluble component. In a case where the weight-average molecular weight is equal to or smaller than 200,000, it is possible to improve the self-dispersion stability. The weight-average molecular weight can be measured by the aforementioned GPC method.

From the viewpoint of the self-dispersibility and the aggregation rate in a case where the resin contacts the treatment liquid, the polymer constituting the resin is preferably a polymer having an acid value of equal to or smaller than 100 mg KOH/g, and more preferably a polymer having an acid value 25 mg KOH/g to 100 mg KOH/g.

In a case where the resin is used in the form of particles (resin particles), the volume-average particle diameter of the particles is preferably within a range of 1 nm to 200 nm, more preferably within a range of 1 nm to 150 nm, and even more preferably within a range of 1 nm to 100 nm. In a case where the volume-average particle diameter is equal to or greater than 1 nm, the manufacturing suitability is improved. In a case where the volume-average particle diameter is equal to or smaller than 200 nm, the storage stability is improved. The particle size distribution of the resin particles is not particularly limited, and the resin particles may have a wide particle size distribution or a monodispersed particle size distribution. Furthermore, two or more kinds of resin particles may be used by being mixed together.

The volume-average particle diameter of the resin particles can be measured by the aforementioned method.

The content of the resin (total content in a case where two or more kinds of resins are used) in the second ink composition is not particularly limited. The content of the resin with respect to the total mass of the second ink composition is preferably 0.3% by mass to 10.0% by mass, more preferably 0.5% by mass to 7.0% by mass, and even more preferably 1.0% by mass to 6.0% by mass.

In a case where the content is equal to or greater than 0.3% by mass, the rub resistance of the image can be further improved.

It is advantageous that the content is equal to or smaller than 10.0% by mass, because then the jettability of the ink can be further improved, and the occurrence of a precipitate in an environment with a low temperature is inhibited.

(Wax)

The second ink composition contains at least one kind of wax. In a case where the second ink composition contains a wax, the rub resistance can be further improved.

From the viewpoint of the dispersion stability of the wax in the ink composition, it is preferable that the wax is contained in the ink composition in the form of particles. That is, it is preferable that the wax is contained in the ink composition in the form of wax particles. In a case where the ink composition contains a wax, latex may also be used.

Examples of the wax include natural wax or synthetic wax including plant wax such as carnauba wax, candelilla wax, beeswax, rice wax, and lanolin, animal wax, petroleum-based wax such as paraffin wax, microcrystalline wax, polyethylene wax, oxidized polyethylene wax, and petrolatum, mineral wax such as montan wax and ozokerite, synthetic wax such as carbon wax, Hoechst wax, polyolefin wax, and stearic acid amide wax, and an α-olefin.maleic anhydride copolymer, a mixture of these, and the like.

It is preferable that the wax is added in the form of a dispersion. For example, the wax can be contained in the second ink composition in the form of a dispersion such as an emulsion. In a case where the wax is made into a dispersion, water is preferable as a dissolvent. However, the present invention is not limited thereto, and for example, a generally used organic dissolvent can be appropriately selected and used at the time of dispersion. Regarding the organic dissolvent, the description in paragraph "0027" in JP2006-91780A can be referred to.

One kind of wax can be used singly, or plural kinds of waxes can be used by being mixed together.

As the wax, commercially available products may be used. Examples of the commercially available products include NOPCOAT PEM17 (manufactured by SAN NOPCO LIMITED), CHEMIPEARL (registered trademark) W4005 (manufactured by Mitsui Chemicals, Inc.), AQUACER 515 and AQUACER 593 (manufactured by BYK-Chemie Japan K.K.), CELLOSOLVE 524 (manufactured by CHUKYO YUSHI CO., LTD.), and the like.

Among the above, as the wax, carnauba wax and polyolefin wax are preferable, and in view of the rub resistance of the image, carnauba wax is particularly preferable.

The ratio between the content of the resin and the content of the wax in the second ink composition is preferably within a range of resin:wax=1:5 to 5:1 (solid content ratio), more preferably within a range of resin:wax=1:2 to 2:1, and particularly preferably 1.2:1 to 1.7:1. In a case where the content ratio is within the above range, the rub resistance of the image becomes excellent.

(Water)

The second ink composition contains water.

The content of water is not particularly limited, but can be preferably equal to or greater than 50% by mass with respect to the total mass of the second ink composition, for example.

The content of water with respect to the total mass of the second ink composition is preferably equal to or greater than 50% by mass and equal to or smaller than 80% by mass, more preferably equal to or greater than 50% by mass and equal to or smaller than 75% by mass, and even more preferably equal to or greater than 50% by mass and equal to or smaller than 70% by mass.

(Water-Soluble Solvent)

The second ink composition may contain a water-soluble solvent.

As the water-soluble solvent, known water-soluble solvents can be used without limitation.

Specific examples of the water-soluble solvent are the same as the water-soluble solvents that can be used in the first ink composition.

The content of the water-soluble solvent (total content in a case where two or more kinds of water-soluble solvents are used) in the second ink composition with respect to the total mass of the second ink composition is preferably 10% by mass to 60% by mass.

In a case where the total content is equal to or greater than 10% by mass, the jettability of the ink from the head and the storage stability are further improved.

The total content with respect to the total mass of the second ink composition is more preferably 15% by mass to 55% by mass, and even more preferably 20% by mass to 50% by mass.

(Surfactant)

If necessary, the second ink composition can contain at least one kind of surfactant. The surfactant can be used as a surface tension adjuster, for example.

As the surfactant, it is possible to effectively use a compound having a structure including both the hydrophilic portion and the hydrophobic portion in a molecule, and to use any of an anionic surfactant, a cationic surfactant, an amphoteric surfactant, a nonionic surfactant, and a betaine-based surfactant. Furthermore, the aforementioned polymer dispersant may be used as a surfactant. In addition, a fluorine-based surfactant can also be preferably used.

Specific examples of the surfactant are the same as the surfactants that can be used in the first ink composition. Furthermore, the preferred aspect is also the same as the surfactants that can be used in the first ink composition.

<Other Components>

If necessary, the second ink composition may contain other components in addition to the aforementioned components.

Examples of other components include known additives such as urea, colloidal silica, an aqueous polymer compound, an antifoaming agent, a solid wetting agent, an antifading agent, an emulsification stabilizer, a penetration enhancer, an ultraviolet absorber, a preservative, a fungicide, a pH adjuster, a viscosity adjuster, a rust inhibitor, and a chelating agent.

<Preferred Physical Properties of Ink Composition>

The physical properties of the second ink composition are not particularly limited, but are preferably as below.

From the viewpoint of the aggregation rate and the dispersion stability of the composition, the pH of the second ink composition at 25° C. (±1° C.) is preferably equal to or higher than 7.5.

The pH (25° C.±1° C.) of the ink composition is preferably pH 7.5 to pH 13, and more preferably pH 7.5 to pH 10. The pH is a value measured using a pH meter WM-50EG (manufactured by DKK-TOA CORPORATION) under the condition of 25° C. (±1° C.).

From the viewpoint of the aggregation rate, the viscosity of the second ink composition is preferably within a range of 0.5 mPa·s to 20 mPa·s, and more preferably within a range of 4 mPa·s to 15 mPa·s.

The viscosity is a value measured using a VISCOMETER TV-22 (manufactured by TOKI SANGYO CO., LTD) under the condition of 25° C. (±1° C.).

The surface tension of the second ink composition at 25° C. (±1° C.) is preferably equal to or lower than 60 mN/m, more preferably 18 mN/m to 50 mN/m, and even more preferably 20 mN/m to 45 mN/m. The surface tension is a value measured using an Automatic Surface Tensiometer CBVP-Z (manufactured by Kyowa Interface Science Co., LTD.) under the condition of 25° C. (±1° C.) by using a plate method.

<Application Method>

The application of the second ink composition can be performed using a coating method, for example, a known method such as an ink jet method or an immersion method. Coating can be performed by a known coating method using a bar coater, an extrusion die coater, an air knife coater, a blade coater, a rod coater, a knife coater, a squeeze coater, a reverse roll coater, or the like. The ink jet method will be specifically described later.

In a case where coating is performed using a coater, from the viewpoint of avoiding the mixing of the first ink composition with the second ink composition on the coater, an ink jet method is preferred as a method for applying the second ink composition.

<Preferred Aspect in Second Ink Applying Step>

In the second ink applying step, an aspect is preferable in which the resin in the second ink composition is resin particles, the wax in the second ink composition is wax particles, and the second ink composition is applied by an ink jet method.

As described above, in a case where coating is performed using a coater, from the viewpoint of avoiding the mixing of the first ink composition with the second ink composition on the coater, it is preferable to apply the second ink composition by an ink jet method. Furthermore, it is advantageous to use the resin particles and the wax particles, because then it is easy to adjust the viscosity of the second ink composition such that the ink composition is easily jetted by an ink jet method.

[Drying Step]

The image forming method may include a drying step of drying the treatment liquid, the first ink composition, or the second ink composition applied in each step, after each of the treatment liquid applying step, the first ink applying step, and the second ink applying step.

In this step, it is preferable that the aforementioned image is dried by heating.

Examples of means for performing drying by heating include known heating means such as a heater, known blasting means such as a drier, and means obtained by combining these.

Examples of the method for performing drying by heating include a method of heating image by using a heater or the like from a surface of the substrate opposite to the image-formed surface (recording surface) of the substrate, a method of exposing the image-formed surface of the substrate to warm air or hot air, a method of heating the image by using an infrared heater from the image-formed surface of the substrate or from the surface of the substrate opposite to the image-formed surface, a method implemented by combining a plurality of these methods, and the like.

The heating temperature at the time of drying by heating is preferably equal to or higher than 60° C., more preferably equal to or higher than 65° C., and particularly preferably equal to or higher than 70° C.

The upper limit of the heating temperature is not particularly limited, but is preferably equal to or lower than 100° C. and more preferably equal to or lower than 90° C.

The time required for the drying by heating is not particularly limited, but is preferably 0.1 seconds to 30 seconds, more preferably 0.2 seconds to 20 seconds, and particularly preferably 0.5 seconds to 10 seconds.

[Ink Jet Image Forming Apparatus]

The image forming apparatus that can be used in the image forming method of an embodiment of the present invention is not particularly limited, and known image forming apparatuses can be used which are described in JP2010-83021A, JP2009-234221A, JP1997-175315A (JP-H10-175315A), and the like.

Hereinafter, an example of the image forming apparatus that can be used in the image forming method of an embodiment of the present invention will be described with reference to FIG. 1 or 2.

Then, an example of the ink jet image forming apparatus suitable for embodying the image forming method of an embodiment of the present invention will be specifically described with reference to FIG. 1.

FIG. 1 is a schematic block diagram showing an example of the overall constitution of the ink jet image forming apparatus.

As shown in FIG. 1, the ink jet image forming apparatus is provided with a treatment liquid applying portion 12 including an anilox roller 20 and a coating roller 22 abutting on the anilox roller 20 that are roller materials sequentially coating a substrate with the treatment liquid in a transport direction (arrow direction in the drawing) of the substrate, a treatment liquid drying zone 13 including heating means (not shown in the drawing) for drying the applied treatment liquid, an ink jet portion 14 jetting various ink compositions, and an ink drying zone 15 drying the jetted ink compositions.

By transport rollers, the substrate supplied to the ink jet image forming apparatus is transported from a paper feeding portion feeding a substrate from a case loaded with the substrate to the treatment liquid applying portion 12, the treatment liquid drying zone 13, the ink jet portion 14, and the ink drying zone 15 in this order, and integrated in an integration portion. For transport, in addition to a method using transport rollers, a drum transport method using a drum-like member, a belt transport method, a stage transport method using a stage, and the like may be adopted.

Among the plurality of transport rollers provided, at least one roller can be a driving roller to which the power of a motor (not shown in the drawing) is transmitted. By causing the driving roller rotating by a motor to rotate at a constant speed, a substrate is transported along a predetermined direction in a predetermined transport amount.

The treatment liquid applying portion 12 is provided with the anilox roller 20 of which a portion is immersed in a storage plate containing the treatment liquid and the coating roller 22 which abuts on the anilox roller 20. The anilox roller 20 is a roller material for supplying the treatment liquid in a predetermined amount to the coating roller 22 disposed to face the recording surface of the substrate. By the coating roller 22 to which an appropriate amount of treatment liquid is supplied from the anilox roller 20, the substrate is evenly coated with the treatment liquid.

The coating roller 22 is substituted such that it can transport the substrate by being paired with an opposite roller 24. The substrate goes through the space between the coating roller 22 and the opposite roller 24 and is transported to the treatment liquid drying zone 13.

On the downstream side of the treatment liquid applying portion 12 in the transport direction of the substrate, the treatment liquid drying zone 13 is disposed. The treatment liquid drying zone 13 can be constituted with known heating means such as a heater, blasting means exploiting blasting, or means obtained by combining these. Examples of the heating means include a method of installing a heating substance such as heater on a side opposite to the treatment liquid-applied surface of the substrate (for example, in a case where the substrate is automatically transported, the lower side of a transport mechanism transporting the substrate loaded thereon), a method of exposing the treatment liquid-applied surface of the substrate to warm air or hot air, a heating method using an infrared heater, and the like. Furthermore, the treatment liquid may be dried by means obtained by a plurality of methods described above.

The surface temperature of the substrate varies with the type (material, thickness, or the like) of the substrate, the environmental temperature, and the like. Therefore, it is preferable to provide a measurement portion which measures the surface temperature of the substrate and a control mechanism which feeds the value of surface temperature of the substrate measured by the measurement portion back to a heating control portion, such that the treatment liquid is applied under temperature control. As the measurement portion which measures the surface temperature of the substrate, a contact-type or a noncontact-type thermometer is preferable.

Furthermore, the dissolvent may be removed using a dissolvent removing roller or the like. In another aspect, a method is used in which the surplus dissolvent is removed using an air knife.

The ink jet portion 14 is disposed on the downstream side of the treatment liquid drying zone 13 in the transport direction of the substrate. In the ink jet portion 14, recording heads (ink jet heads) 30K, 30C, 30M, and 30Y are disposed connected to each of the ink storage units storing inks of colors of black (K), cyan (C), magenta (M), and yellow (Y) as the first ink composition. Each of the ink storage units not shown in the drawing stores the first ink composition containing a coloring material corresponding to each color and water. At the time of recording an image, if necessary, the first ink composition is supplied to each of the ink jet heads 30K, 30C, 30M, and 30Y. On the downstream side of the ink jet heads 30K, 30C, 30M, and 30Y in the transport direction, as shown in FIG. 1, recording heads 30A and 30B for jetting the second ink composition are provided such that the second ink composition can be jetted.

Each of the ink jet heads 30K, 30C, 30M, and 30Y jets the ink corresponding to an image by using jetting nozzles disposed to face the recording surface of the substrate. As a result, the ink of each color is applied onto the recording surface of the substrate, and a color image is formed.

All of the ink jet heads 30K, 30C, 30M, 30Y, 30A, and 30B are full line heads in which a large number of nozzles covering the maximum recording width of the image recorded on the substrate are arranged. Compared to a serial-type head by which recording is performed in a state where a short shuttle head is being caused to perform scanning back and forth along the width direction (direction orthogonal to the transport direction within a transport plane of a substrate) of a substrate, the full line heads make it possible to form an image on a substrate at a higher speed. In an embodiment of the present invention, any of the image formation by a serial-type head and the recording by a method that enables an image to be formed at a relatively high speed, for example, a single-pass method that forms one line by a single scanning operation may be adopted. However, according to the image forming method of an embodiment of the present invention, even with the single-pass method, a high-quality image with high reproducibility is obtained.

Herein, all of the ink jet heads 30K, 30C, 30M, 30Y, 30A, and 30B have the same constitution.

These ink jet heads include a nozzle plate, although the nozzle plate is not shown in the drawing. The nozzle plate is provided with two-dimensionally arranged nozzle holes.

It is preferable to control the amount of the treatment liquid applied and the amount of the ink composition applied as necessary. For example, according to the substrate, in order to control the physical properties such as viscoelasticity of the aggregate generated by the mixing of the treatment liquid with the ink composition, the amount of the treatment liquid may be changed.

The ink drying zone 15 is disposed on the downstream side of the ink jet portion 14 in the transport direction of the substrate. The ink drying zone 15 can have the same constitution as the treatment liquid drying zone 13.

In the ink jet image forming apparatus, heating means for performing a heating treatment on the substrate may be disposed in a transport path from the paper feeding portion to the integration portion. For example, by disposing the heating means in an intended position such as the upstream side of the treatment liquid drying zone 13 or between the ink jet portion 14 and the ink drying zone 15 and heating the substrate to an intended temperature, it is possible to effectively perform drying and fixing.

Next, an example of the ink jet image forming apparatus suitable for embodying the image forming method of an embodiment of the present invention will be specifically described with reference to FIG. 2.

Figure 2:
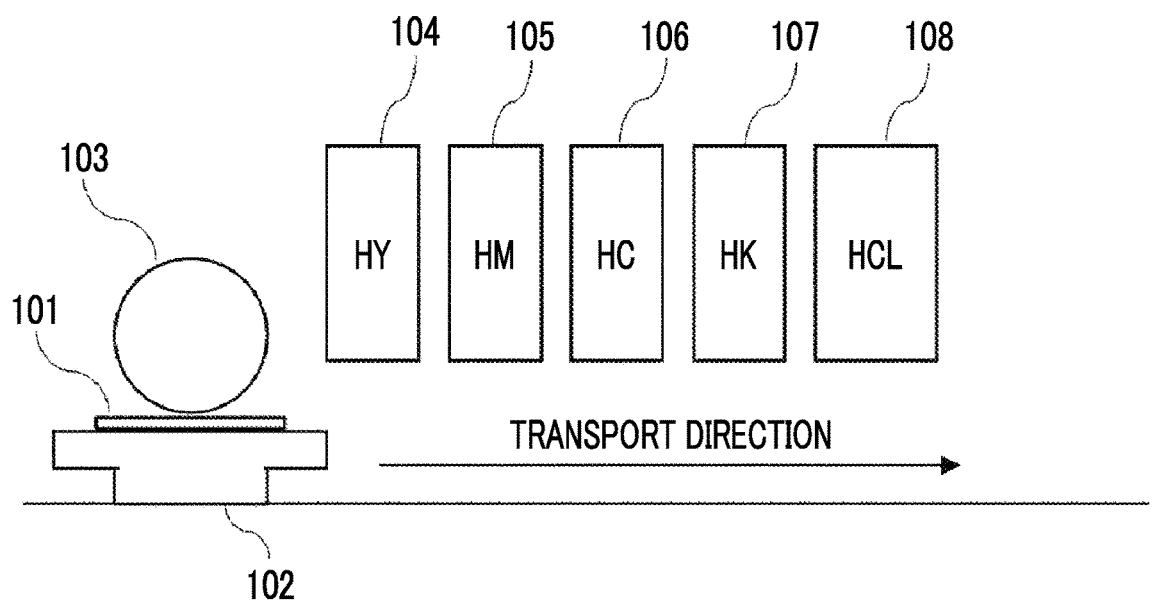
FIG. 2 is a schematic block diagram showing an example of the constitution of an ink jet image forming apparatus used in Example 1.

FIG. 2 is a schematic block diagram showing an example of the constitution of a roll transport-type ink jet image forming apparatus.

As shown in FIG. 2, the roll transport-type ink jet image forming apparatus includes a linear slider transport unit 102 transporting a corrugated cardboard substrate 101, a flexo coater 103 coating the corrugated cardboard substrate with the treatment liquid, a yellow ink head (HY) 104 jetting the first ink composition, a magenta ink head (HM) 105, a cyan ink head (HC) 106, a black ink head (HK) 107, and a clear ink head (HCL) 108 jetting the second ink composition.

The corrugated cardboard substrate 101 supplied to the ink jet image forming apparatus is fixed onto the linear slider transport unit 102, and transported in the transport direction (arrow direction in the drawing) by the linear slider transport unit 102.

When the corrugated cardboard substrate 101 is transported to the flexo coater 103, the yellow ink head (HY) 104, the magenta ink head (HM) 105, the cyan ink head (HC) 106, the black ink head (HK) 107, and or clear ink head (HCL) 108 jetting the second ink composition, the corrugated cardboard substrate is coated with the treatment liquid by the flexo coater and applied with the first ink composition or the second ink composition by each of the heads.

Each of the heads is connected to an ink storage unit storing the corresponding ink of each color (for example, the yellow ink head is connected to a yellow ink storage unit). Each of the ink storage units not shown in the drawing stores the first ink composition or the second ink composition corresponding to each color, and supplies the first or second ink composition to the head of each ink as necessary at the time of forming an image.

Each of the heads jets an ink corresponding to an image by using jetting nozzles disposed to face the recording surface of the substrate. As a result, each ink is applied onto the recording surface of the corrugated cardboard substrate, and an image is formed.

[Corrugated Cardboard]

The corrugated cardboard of the present invention includes an image formed by the aforementioned image forming method. Therefore, the corrugated cardboard has an image which has excellent flexo color reproducibility and rub resistance and in which the occurrence of mottling is inhibited.

EXAMPLES

Hereinafter, the present invention will be more specifically described based on examples, but the present invention is not limited to the following examples as long as the gist of the present invention is not impaired. Herein, unless otherwise specified, "part" is based on mass.

[Treatment Liquid]

By mixing components together according to the following composition, a treatment liquid 1 was prepared and used as a treatment liquid.

The viscosity of the treatment liquid 1 that was measured using a VISCOMETER TV-22 (manufactured by TOKI SANGYO CO., LTD) was 2.9 mPa·s at 25° C.

The surface tension of the treatment liquid 1 that was measured using an Automatic Surface Tensiometer CBVP-Z (manufactured by Kyowa Interface Science Co., LTD.) was 41 mN/m at 25° C.

The pH of the treatment liquid 1 that was measured using a pH meter WM-50EG (manufactured by DKK-TOA CORPORATION) was pH 0.78 at 25° C.

—Composition of Treatment Liquid 1—

| | |
|---|---|
| TPGmME (tripropylene glycol monomethyl ether) | 4.8% by mass |
| DEGmBE (diethylene glycol monobutyl ether) | 4.8% by mass |
| Malonic acid | 9.0% by mass |
| Malic acid | 8.0% by mass |
| Propanetricarboxylic acid | 2.5% by mass |
| 85% by mass aqueous phosphoric acid solution | 6.0% by mass |
| Antifoaming agent (TSA-739 (15% by mass) manufactured by Momentive Performance Materials Japan LLC; emulsion type silicone-based antifoaming agent) | 0.01% by mass as amount of silicone oil |

-continued

| | |
|---|---|
| Benzotriazole | 1.0% by mass |
| Deionized water | balance to result in 100% by mass in total |

[Preparation of First Ink Composition]

Components were mixed together according to the following composition, and the mixture was stirred for 20 minutes by using a mixer (L4R manufactured by Silverson) at room temperature at 5,000 rpm, thereby preparing a cyan ink C1 (first ink composition). The viscosity of the prepared ink that was measured using a VISCOMETER TV-22 (manufactured by TOKI SANGYO CO., LTD) was 8 mPa·s at 25° C.

The surface tension of the prepared ink that was measured using an Automatic Surface Tensiometer CBVP-Z (manufactured by Kyowa Interface Science Co., LTD.) was 30 mN/m at 25° C.

<Composition of Cyan Ink C1>

| | |
|---|---|
| Cyan pigment dispersion: Projet Cyan APD 1000 (manufactured by FUJIFILM Imaging Colorants, Inc., pigment concentration: 14% by mass) | 21 parts |
| Water-soluble solvent: glycerin (manufactured by Wako Pure Chemical Industries, Ltd.) | 40 parts |
| Water-soluble solvent: diethylene glycol monoisobutyl ether (manufactured by Wako Pure Chemical Industries, Ltd.) | 9 parts |
| Surfactant: SURFYNOL (registered trademark) 104 PG50 (manufactured by DAITO CHEMICAL CO., LTD., concentration of solid contents: 50% by mass) | 0.6 parts |
| Deionized water | balance to result in 100 parts in total |

By using the commercially available pigment dispersion shown in Table 1, a magenta ink M1, a yellow ink Y1, and a black ink K1 were prepared according to the composition shown in the following Table 1 by the same method as used for preparing the cyan ink C1.

Furthermore, a cyan ink C0, a magenta ink M0, a yellow ink Y0, and a black ink K0 were prepared by the same method according to the composition shown in the following Table 1. In the following table 1, "-" means that the ink does not contain the corresponding component. The numerical values in Table 1 represent the content of each composition (unit: part by mass). Furthermore, in Table 1, the unit of concentration is % by mass.

[Preparation of Second Ink Composition]

Components were mixed together according to the following composition, and the mixture was stirred for 20 minutes by using a mixer (L4R manufactured by Silverson) at room temperature at 5,000 rpm, thereby preparing a clear ink CL1 (second ink composition).

The viscosity of the prepared ink that was measured using a VISCOMETER TV-22 (manufactured by TOKI SANGYO CO., LTD) was 8 mPa·s at 25° C.

The surface tension of the prepared ink that was measured using an Automatic Surface Tensiometer CBVP-Z (manufactured by Kyowa Interface Science Co., LTD.) was 30 mN/m at 25° C.

<Composition of Clear Ink CL1>

| | |
|---|---|
| Water-soluble solvent: glycerin (manufactured by Wako Pure Chemical Industries, Ltd.) | 27 parts |
| Polyethylene glycol (average molecular weight: 8,000): PEG 8000 (manufactured by MP Biomedicals, Inc) | 4 parts |
| Urethane latex: WBR 2101 (manufactured by TAISEI FINE CHEMICAL CO., LTD., concentration of solid contents: 26% by mass, no melting point) | 23 parts |
| Carnauba wax: CELLOSOLVE (registered trademark) 524 (manufactured by CHUKYO YUSHI CO., LTD., concentration of solid contents: 30% by mass, melting point: 83° C.) | 13 parts |
| Surfactant: SURFYNOL (registered trademark) 104 PG50 (manufactured by DAITO CHEMICAL CO., LTD., concentration of solid contents: 50% by mass) | 0.6 parts |
| Deionized water | balance to result in 100 parts in total |

Clear inks CL2, CL3, and CL4 were prepared by the same method as used for preparing the clear ink CL1 according to the composition in the following Table 1.

TABLE 1

| | Concentration | C0 | M0 | Y0 | K0 | C1 | M1 | Y1 | K1 | CL1 | CL2 | CL3 | CL4 |
|---|---|---|---|---|---|---|---|---|---|---|---|---|---|
| Projet Cyan APD 1000 | 14% | 21 | — | — | — | 21 | — | — | — | — | — | — | — |
| Projet Magenta APD 1000 | 14% | — | 36 | — | — | — | 36 | — | — | — | — | — | — |
| Projet Yellow APD 1000 | 14% | — | — | 29 | — | — | — | 29 | — | — | — | — | — |
| Projet Black APD 1000 | 14% | — | — | — | 26 | — | — | — | 26 | — | — | — | — |
| Glycerin | 100% | 24 | 10 | 19 | 7 | 40 | 30 | 35 | 25 | 27 | 27 | 27 | 27 |
| Diethylene glycol monoisopropyl ether | 100% | 4 | 10 | 8 | 15 | 9 | 9 | 9 | 9 | — | — | — | — |
| PEG8000 | 100% | — | — | — | — | — | — | — | — | 4 | 4 | 4 | 4 |
| WBR 2101 (urethane latex) | 26% | 23 | 23 | 23 | 23 | — | — | — | — | 23 | 23 | — | — |
| EM-94 (acrylate latex) | 23% | — | — | — | — | — | — | — | — | — | — | — | 26 |
| CELLOSOLVE 524 (carnauba wax) | 30% | 13 | 13 | 13 | 13 | — | — | — | — | 13 | — | 13 | 13 |

TABLE 1-continued

|  | Concentration | C0 | M0 | Y0 | K0 | C1 | M1 | Y1 | K1 | CL1 | CL2 | CL3 | CL4 |
|---|---|---|---|---|---|---|---|---|---|---|---|---|---|
| SURFYNOL 104 PG50 | 50% | 0.6 | 0.6 | 0.6 | 0.6 | 0.6 | 0.6 | 0.6 | 0.6 | 0.6 | 0.6 | 0.6 | 0.6 |
| Deionized water |  | Balance | Balance | Balance | Balance | Balance | Balance | Balance | Balance | Balance | Balance | Balance | Balance |
| Total |  | 100 | 100 | 100 | 100 | 100 | 100 | 100 | 100 | 100 | 100 | 100 | 100 |
| Viscosity (mPa·s) |  | 12 | 12 | 12 | 12 | 8 | 8 | 8 | 8 | 8 | 8 | 8 | 8 |
| Surface tension (mN/m) |  | 30 | 30 | 30 | 30 | 30 | 30 | 30 | 30 | 30 | 30 | 30 | 30 |

Details of the components in Table 1 are as below.

Projet Magenta APD 1000 (pigment dispersion of magenta, manufactured by FUJIFILM Imaging Colorants, Inc.)

Projet Black APD 1000 (pigment dispersion of black, manufactured by FUJIFILM Imaging Colorants, Inc.)

Projet Yellow APD 1000 (pigment dispersion of yellow, manufactured by FUJIFILM Imaging Colorants, Inc.)

PEG 8000 (polyethylene glycol (average molecular weight: 8,000), manufactured by MP Biomedicals, Inc.)

WBR 2101 (urethane latex (resin particles)), no melting point, volume-average particle diameter: 50 nm, manufactured by TAISEI FINE CHEMICAL CO., LTD.)

EM-94 (acryl latex (resin particles)), no melting point, volume-average particle diameter: 3 nm, manufactured by TAISEI FINE CHEMICAL CO., LTD.)

CELLOSOLVE 524 (carnauba wax (wax particles)), melting point: 83° C., volume-average particle diameter: 65 nm, manufactured by CHUKYO YUSHI CO., LTD.)

SURFYNOL (registered trademark) 104 PG50 (surfactant, manufactured by DAITO CHEMICAL CO., LTD.)

—Measurement of Melting Point—

The melting point of the wax particles and the resin particles described above was measured as below.

A water dispersion of wax particles in an amount of 0.5 g expressed in terms of the solid content was dried under reduced pressure for 4 hours at 50° C., thereby obtaining wax particles (solid content). The melting point of the obtained wax particles was measured using a differential scanning calorimetry (DSC) EXSTAR 6220 manufactured by Hitachi High-Tech Science Corporation.

5 mg of the wax particles (solid content) were sealed in an aluminum pan, and in a nitrogen atmosphere, the temperature of the wax particles (solid content) was changed according to the following temperature profile. The value of a peak top (endothermal peak) of DSC obtained when the temperature of the wax particles was secondly heated according to the following temperature profile was taken as the melting point of the wax particles.

The melting point of the resin particles was also measured by the same method as used for measuring the melting point of the wax particles. As a result, a peak top (endothermal peak) of DSC was not observed. That is, the melting point of the resin particles was not observed, and the resin particles did not have a melting point.

—Temperature Profile in Measurement of Melting Point—

30° C.→−50° C. (cooling at 50° C./min)
−50° C.→220° C. (heating at 20° C./min)
220° C.→−50° C. (cooling at 50° C./min)
−50° C.→220° C. (heating at 20° C./min)

—Measurement of Volume-Average Particle Diameter—

The volume-average particle diameter of the wax particles and the resin particles described above was measured by a dynamic light scattering method by using a particle size distribution measurement apparatus UPA-EX150 (manufactured by NIKKISO CO., LTD).

[Image Formation]

Example 1

The ink jet image forming apparatus shown in FIG. 2 was prepared.

The image forming apparatus included the flexo coater 103 (amount of coating solution: 1 ml/m²), the linear slider transport unit 102 (variable within a range of 1 m/min to 50 m/min), the yellow ink head (HY) 104 (SG1024 manufactured by Fujifilm Dimatix, Inc, volume of liquid droplets: 30 picoliters, nozzle density: 400 npi (400 nozzles/inch), number of nozzles: 1024), the magenta ink head (HM) 105 (SG1024 manufactured by Fujifilm Dimatix, Inc, volume of liquid droplets: 30 picoliters, nozzle density: 400 npi (400 nozzles/inch), number of nozzles: 1024), the cyan ink head (HC) 106 (SG1024 manufactured by Fujifilm Dimatix, Inc, volume of liquid droplets: 30 picoliters, nozzle density: 400 npi (400 nozzles/inch), number of nozzles: 1024), the black ink head (HK) 107 (SG1024 manufactured by Fujifilm Dimatix, Inc, volume of liquid droplets: 30 picoliters, nozzle density: 400 npi (400 nozzles/inch), number of nozzles: 1024), and the clear ink head (HCL) 108 (SG1024 manufactured by Fujifilm Dimatix, Inc, volume of liquid droplets: 30 picoliters, nozzle density: 400 npi (400 nozzles/inch), number of nozzles: 1024).

The distance between each of the heads and the substrate was set to be 5 mm.

The treatment liquid, the first ink composition, and the second ink composition were used by being combined (level 1 to level 12) as shown in the following Table 3.

As a corrugated cardboard substrate, a corrugated cardboard 1 described below was used.

The corrugated cardboard 1 is a double wall corrugated cardboard having A flute-type corrugation in which a K liner (manufactured by Rengo Co., Ltd.) is used as base paper of the corrugated cardboard and a general corrugating medium (manufactured by Ojimateria co., ltd.) is used as a corrugating medium.

The Lab values of the surface of the corrugated cardboard 1 were L*=61.41, a*=8.39, and b*=29.44. The Lab values were measured using Spectrolino manufactured by Gretag-Macbeth GmbH.

(Treatment Liquid Applying Step)

The aforementioned corrugated cardboard substrate was fixed onto the linear slider transport unit of the roll transport-type ink jet image forming apparatus. Then, while the linear slider transport unit onto which the corrugated cardboard substrate was fixed was being transported at a constant speed of 50 m/min in the transport direction, the corrugated cardboard substrate was coated with the treatment liquid 1 by using the flexo coater at 1 ml/m². In a case where the corrugated cardboard substrate is coated with the treatment liquid 1 at 1 ml/m², the amount of an acidic compound applied onto the corrugated cardboard substrate becomes 0.25 g/m².

(Ink Applying Step)

—Image Forming Condition 1—

While the linear slider transport unit was being moved at a constant speed of 50 m/min, to the treatment liquid-applied surface of the corrugated cardboard substrate coated with the treatment liquid 1, the first ink composition prepared as above was jetted from the aforementioned heads (HY, HM, HC, and HK) such the yellow ink was jetted at a dot area rate of 50%, the magenta ink was jetted at a dot area rate of 50%, the cyan ink was jetted at a dot area rate of 50%, and the black ink was jetted at a dot area rate of 100%. In a case of the present invention in which a clear ink (second ink composition) was used, the clear ink was jetted at a dot area rate of 100%. The ink composition was applied in a size of 5 cm×20 cm. In this way, an image sample was obtained.

—Image Forming Condition 2—

While the linear slider transport unit was being moved at a constant speed of 50 m/min, to the treatment liquid-applied surface of the corrugated cardboard substrate coated with the treatment liquid 1, the first ink composition prepared as above was jetted from the aforementioned heads (HY, HM, HC, and HK). Then, a chart of a plurality of patches of different colors was printed out, thereby obtaining an image sample. In a case where a clear ink was used, the clear ink was jetted at a dot area rate of 100%.

The color of each of the patches was adjusted by jetting the yellow ink, the magenta ink, the cyan ink, and the black ink by means of varying the dot area rate thereof by 1% within a range of 1% to 100%. Each of the patches had a size of 1 cm×1 cm.

—Image Forming Condition 3—

Among the patches of the chart printed out in Image forming condition 2, the color closest to "D 240 brown" as a standard color in 2006 edition of "Sample book of corrugated cardboard printing ink" was formed into an image having a size of 5 cm×20 cm. At this time, the transport speed was 50 m/min.

[Evaluation]

(Rub Resistance)

On the sample prepared under Image forming condition 1, a rubbing test was performed 500 times according to JIS P 8136 by using a Gakushin-type tester manufactured by Nihon T. M. C Corporation, and the rub resistance was evaluated according to the following evaluation standards. As rubbing paper, a white liner (manufactured by Ojimateria co., ltd.) was used. The evaluation results are shown in the following Table 3.

The density of color transferred was measured using Spectrolino manufactured by GretagMacbeth GmbH.

~Evaluation Standards~

1: No scratch was observed on the corrugated cardboard side, and the density of color transferred to the white liner side was equal to or lower than 0.05.

2: No scratch was observed on the corrugated cardboard side, and the density of color transferred to the white liner side was higher than 0.05 and less than 0.1.

3: Slight scratches were observed on the corrugated cardboard side, and the concentration of color transferred to the white liner side was equal to or higher than 0.1.

4: Scratches were clearly observed on the corrugated cardboard side, and the density of color transferred to the white liner side was equal to or higher than 0.1.

5: The original color of the corrugated cardboard side was seen, and the density of color transferred to the white liner side was equal to or higher than 0.1.

(Flexo Proximity)

All of the color patches prepared under Image forming condition 2 were measured using Spectrolino manufactured by GretagMacbeth GmbH, and compared with the standard colors (17 colors except for white) (following Table 2) in the 2006 edition of "Sample book of corrugated cardboard printing ink" published by three relevant associations of Japan Corrugated Case Association, Japan Paper-box & Corrugated-box Association, and JAPAN PRINTING INK MAKERS ASSOCIATION so as to investigate the color difference. Furthermore, the flexo proximity (flexo color reproducibility) was evaluated according to the following evaluation standards. The evaluation results are shown in the following Table 3.

TABLE 2

| ~Standard colors in "Sample book of corrugated cardboard printing ink"~ | |
|---|---|
| Code No. | Color name |
| D 010 | Peony |
| D 030 | Red |
| D 040 | Red |
| D 050 | Orange |
| D 060 | Orange |
| D 070 | Yellow |
| D 090 | Green |
| D 110 | Green |
| D 130 | Pale yellow |
| D 140 | Ultramarine |
| D 160 | Indigo |
| D 170 | Dark indigo |
| D 180 | Dark indigo |
| D 200 | Purple |
| D 220 | Brown |
| D 240 | Brown |
| D 260 | Black |

~Evaluation Standards~

1: The value of ΔE of a color patch showing the biggest color difference with respect to the 17 standard colors satisfied ΔE≤5.

2: The value of ΔE of a color patch showing the biggest color difference with respect to the 17 standard colors satisfied 5<ΔE≤7.

3: The value of ΔE of a color patch showing the biggest color difference with respect to the 17 standard colors satisfied 7<ΔE≤10.

4: The value of ΔE of a color patch showing the biggest color difference with respect to the 17 standard colors satisfied ΔE>10.

(Mottling)

The in-plane uniformity of the image formed under Image forming condition 3 was evaluated. By using a microdensitometer (2405-type microdensitometer (manufactured by SAKATA INX ENG CO., LTD.), the density of 10 sites within the plane was measured. The color difference between a color of the highest density and a color of the lowest density was calculated and taken as an in-plane color difference. The in-plane color difference was used as a parameter for evaluating mottling according to the following evaluation standards. The evaluation results are shown in the following Table 3. The results show that the smaller the in-plane color difference is, the further the occurrence of mottling is inhibited.

~Evaluation Standards~
1: The in-plane color difference satisfied ΔE≤3.
2: The in-plane color difference satisfied 3<ΔE≤5.
3: The in-plane color difference satisfied 5<ΔE≤7.
4: The in-plane color difference satisfied 7<ΔE≤10.
5: The in-plane color difference satisfied ΔE>10.

From the results, it is understood that by using a treatment liquid and separately applying the first ink composition containing a coloring material and the second ink composition containing a resin and a wax for forming an image, an image is obtained which has excellent rub resistance and flexo color reproducibility and in which the occurrence of mottling is inhibited.

Furthermore, from the comparison between the present invention of level 9 in Table 3 in which a urethane resin is

TABLE 3

| | Level | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Y ink | Y0 | Y1 | Y1 | Y1 | Y1 | Y1 | Y0 | Y1 | Y1 | Y1 | Y1 | Y1 |
| M ink | M0 | M1 | M1 | M1 | M1 | M1 | M0 | M1 | M1 | M1 | M1 | M1 |
| C ink | C0 | C1 | C1 | C1 | C1 | C1 | C0 | C1 | C1 | C1 | C1 | C1 |
| K ink | K0 | K1 | K1 | K1 | K1 | K1 | K0 | K1 | K1 | K1 | K1 | K1 |
| Clear ink | — | — | CL1 | CL2 | CL3 | CL4 | — | — | CL1 | CL2 | CL3 | CL4 |
| Treatment liquid | — | — | — | — | — | — | Treatment liquid 1 | Treatment liquid 1 | Treatment liquid 1 | Treatment liquid 1 | Treatment liquid 1 | Treatment liquid 1 |
| Rub resistance | 2 | 5 | 1 | 3 | 4 | 3 | 2 | 5 | 1 | 3 | 4 | 2 |
| Flexo proximity | 5 | 5 | 5 | 5 | 5 | 5 | 4 | 1 | 1 | 1 | 1 | 1 |
| Mottling | 5 | 5 | 5 | 5 | 5 | 5 | 1 | 1 | 1 | 1 | 1 | 1 |
| | Comparative Example | Comparative Example | Comparative Example | Comparative Example | Comparative Example | Comparative Example | Comparative Example | Comparative Example | Present invention | Comparative Example | Comparative Example | Present invention |

In the table, "—" means that a clear ink or a treatment liquid was not used.

Example 2

The samples were evaluated in the same manner as described above, except that in Example 1, the corrugated cardboard substrate was changed to a corrugated cardboard 2.

The corrugated cardboard 2 is a double wall corrugated cardboard having A flute-type corrugation in which a C liner (manufactured by Ojimateria co., ltd.) is used as base paper of the corrugated cardboard and a general corrugating medium (manufactured by Ojimateria co., ltd.) is used as a corrugating medium.

The Lab values of the surface of the corrugated cardboard 2 were L*=65.09, a*=7.02, and b*=24.4. The Lab values were measured using Spectrolino manufactured by Gretag-Macbeth GmbH.

Example 3

The samples were evaluated in the same manner as described above, except that in Example 1, the corrugated cardboard substrate was changed to a corrugated cardboard 3.

The corrugated cardboard 3 is a double wall corrugated cardboard having A flute-type corrugation in which a light-weight liner (manufactured by Ojimateria co., ltd.) is used as base paper of the corrugated cardboard and a general corrugating medium (manufactured by Ojimateria co., ltd.) is used as a corrugating medium.

The Lab values of the surface of the corrugated cardboard 3 were L*=63.76, a*=7.55, and b*=24.88. The Lab values were measured using Spectrolino manufactured by Gretag-Macbeth GmbH.

In Examples 2 and 3, the same results as in Example 1 were obtained.

used as a resin in the first ink composition and the present invention of level 12 in Table 3 in which an acrylic resin is used as a resin in the first ink composition, it is understood that in a case where a urethane resin is used as a resin, the evaluation results of rub resistance become excellent.

Meanwhile, as shown in the comparative example of level 7 in Table 3, it is understood that in a case where an ink composition is used which contains a coloring material and in which to total content of a resin and a wax is greater than 2% by mass, the evaluation results of flexo color reproducibility become poor.

In addition, as shown in the comparative example of level 8 in Table 3, it is understood that in a case where a treatment liquid is not used for forming an image, the evaluation results of flexo color reproducibility and mottling become poor.

Example 4

A cyan ink C2, a magenta ink M2, a yellow ink Y2, and a black ink K2 shown in the following Table 4 were prepared by the same method as used for preparing the cyan ink C1 in Example 1. In the following Table 4, "-" means that the ink does not contain the corresponding component. The numerical values in Table 4 represent the content of each composition (unit: part by mass). Furthermore, in Table 4, the unit of concentration is % by mass.

TABLE 4

| | Concentration | C2 | M2 | Y2 | K2 |
|---|---|---|---|---|---|
| Projet Cyan APD 1000 | 14% | 21 | — | — | — |
| Projet Magenta APD 1000 | 14% | — | 36 | — | — |

TABLE 4-continued

|  | Concentration | C2 | M2 | Y2 | K2 |
|---|---|---|---|---|---|
| Projet Yellow APD 1000 | 14% | — | — | 29 | — |
| Projet Black APD 1000 | 14% | — | — | — | 26 |
| Glycerin | 100% | 24 | 10 | 19 | 7 |
| Diethylene glycol monoisopropyl ether | 100% | 4 | 10 | 8 | 15 |
| WBR 2101 (urethane latex) | 26% | 2 | 2 | 2 | 2 |
| CELLOSOLVE 524 (carnauba wax) | 30% | 0.3 | 0.3 | 0.3 | 0.3 |
| SURFYNOL 104 PG50 | 50% | 0.6 | 0.6 | 0.6 | 0.6 |
| Deionized water |  | Balance | Balance | Balance | Balance |
| Total |  | 100 | 100 | 100 | 100 |
| Viscosity (mPa · s) |  | 11.5 | 11.5 | 11.5 | 11.5 |
| Surface tension (mN/m) |  | 30 | 30 | 30 | 30 |

Images were formed (level 13) in the same manner as in Example 1 except that in level 9 in Example 1, the yellow ink Y1, the magenta ink M1, the cyan ink C1, and the black ink K1 were changed to the yellow ink Y2, the magenta ink M2, the cyan ink C2, and the black ink K2 shown in the above Table 4. Various evaluations were performed on the images. The results are shown in Table 5.

TABLE 5

| Level | 13 |
|---|---|
| Y ink | Y2 |
| M ink | M2 |
| C ink | C2 |
| K ink | K2 |
| Clear ink | CL1 |
| Treatment liquid | Treatment liquid 1 |
| Rub resistance | 1 |
| Flexo proximity | 2 |
| Mottling | 2 |
|  | Present invention |

Comparative Example

The treatment liquid 1 composed as above was diluted 100× with deionized water, thereby obtaining a treatment liquid 2 having a pH of 2.3.

By using the treatment liquid 2, images were formed (level 14) in the same manner as in level 9 in Example 1, and various evaluations were performed on the images. The results are shown in Table 6.

The amount of the treatment liquid 2 used for coating in the treatment liquid applying step is about 1 ml/m² as in Example 1. In a case where coating is performed using the treatment liquid 2 in an amount of 1 ml/m², the amount of an acidic compound applied onto the corrugated cardboard substrate becomes 0.0025 g/m².

TABLE 6

| Level | 14 |
|---|---|
| Y ink | Y2 |
| M ink | M1 |
| C ink | C1 |
| K ink | K1 |
| Clear ink | CL1 |
| Treatment liquid | Treatment liquid 2 |
| Rub resistance | 1 |
| Flexo proximity | 5 |
| Mottling | 5 |
|  | Comparative Example |

The entirety of the disclosure in JP2015-113396 filed on Jun. 3, 2015 is incorporated into the present specification by reference.

All of the documents, patent applications, and technical standards described in the present specification are incorporated into the present specification by reference, as if the present specification describes that each of the documents, patent applications, and technical standards is specifically and independently incorporated into the present specification by reference.

What is claimed is:

1. An image forming method comprising:
applying a treatment liquid containing at least one kind of acidic compound and having a pH of equal to or lower than 2 onto a corrugated cardboard substrate of 10≤L*≤90 on a CIELab color scale;
applying a first ink composition, which contains a coloring material and water and in which a total content of resin particles and wax particles is equal to or less than 2% by mass with respect to a total mass of the first ink composition, to a treatment liquid-applied surface of the corrugated cardboard substrate onto which the treatment liquid is applied by an ink jet method under a condition of an amount of a liquid droplet of equal to or greater than 10 picoliters; and
applying a second ink composition, which contains a resin, a wax, and water and in which a content of a coloring material is equal to or smaller than 0.5% by mass with respect to a total mass of the second ink composition, onto the first ink composition applied to the corrugated cardboard substrate; wherein
wax refers to a polymer compound having a melting point that is equal to or lower than 170° C., and resin refers to a polymer compound that does not have a melting point or has a melting point that is higher than 170° C.

2. The image forming method according to claim 1, wherein the resin contained in the second ink composition contains a urethane resin.

3. The image forming method according to claim 2, wherein the coloring material contained in the first ink composition contains a pigment.

4. The image forming method according to claim 2, wherein in the applying of the first ink composition to the treatment liquid-applied surface of the corrugated cardboard substrate, the first ink composition is applied using an ink jet head with a nozzle density of equal to or lower than 600 nozzles per inch.

5. The image forming method according to claim 2, wherein in the applying of the first ink composition to the treatment liquid-applied surface of the corrugated cardboard substrate, the first ink composition is applied using an ink jet head with a nozzle density of equal to or lower than 400 nozzles per inch in an amount of a liquid droplet of equal to or greater than 25 picoliters and equal to or smaller than 40 picoliters.

6. The image forming method according to claim 2, wherein the resin in the second ink composition is resin particles,
the wax in the second ink composition is wax particles, and the second ink composition is applied by an ink jet method.

7. The image forming method according to claim 2, wherein in the applying of the first ink composition, the first ink composition is applied at a dot area rate of equal to or higher than 100%.

8. The corrugated cardboard substrate on which an image is formed by the image forming method according to claim 2.

9. The image forming method according to claim 1, wherein the coloring material contained in the first ink composition contains a pigment.

10. The image forming method according to claim 9, wherein in the applying of the first ink composition to the treatment liquid-applied surface of the corrugated cardboard substrate, the first ink composition is applied using an ink jet head with a nozzle density of equal to or lower than 600 nozzles per inch.

11. The image forming method according to claim 9, wherein in the applying of the first ink composition to the treatment liquid-applied surface of the corrugated cardboard substrate, the first ink composition is applied using an ink jet head with a nozzle density of equal to or lower than 400 nozzles per inch in an amount of a liquid droplet of equal to or greater than 25 picoliters and equal to or smaller than 40 picoliters.

12. The image forming method according to claim 9, wherein the resin in the second ink composition is resin particles, the wax in the second ink composition is wax particles, and the second ink composition is applied by an ink jet method.

13. The image forming method according to claim 9, wherein in the applying of the first ink composition, the first ink composition is applied at a dot area rate of equal to or higher than 100%.

14. The corrugated cardboard substrate on which an image is formed by the image forming method according to claim 9.

15. The image forming method according to claim 1, wherein in the applying of the first ink composition to the treatment liquid-applied surface of the corrugated cardboard substrate, the first ink composition is applied using an ink jet head with a nozzle density of equal to or lower than 600 nozzles per inch.

16. The image forming method according to claim 1, wherein in the applying of the first ink composition to the treatment liquid-applied surface of the corrugated cardboard substrate, the first ink composition is applied using an ink jet head with a nozzle density of equal to or lower than 400 nozzles per inch in an amount of a liquid droplet of equal to or greater than 25 picoliters and equal to or smaller than 40 picoliters.

17. The image forming method according to claim 1, wherein the resin in the second ink composition is resin particles, the wax in the second ink composition is wax particles, and the second ink composition is applied by an ink jet method.

18. The image forming method according to claim 1, wherein in the applying of the first ink composition, the first ink composition is applied at a dot area rate of equal to or higher than 100%.

19. The corrugated cardboard substrate on which an image is formed by the image forming method according to claim 1.

20. The image forming method according to claim 1, wherein the wax contained in the second ink composition is selected from the group consisting of carnauba wax, candelilla wax, beeswax, rice wax, lanolin, paraffin wax, microcrystalline wax, polyethylene wax, oxidized polyethylene wax, petrolatum, montan wax, ozokerite, carbon wax, Hoechst wax, polyolefin wax, stearic acid amide wax, an α-olefin.maleic anhydride copolymer, and mixtures thereof.

* * * * *